United States Patent [19]

Schrader et al.

[11] 4,141,735

[45] Feb. 27, 1979

[54] PROCESS FOR REDUCING CORE-SET CURLING TENDENCY AND CORE-SET CURL OF POLYMERIC FILM ELEMENTS

[75] Inventors: Robert W. Schrader; John F. Carroll, Jr., both of Rochester, N.Y.

[73] Assignee: Eastman Kodak Company, Rochester, N.Y.

[21] Appl. No.: 770,128

[22] Filed: Feb. 18, 1977

Related U.S. Application Data

[63] Continuation of Ser. No. 563,882, Mar. 31, 1975, abandoned, which is a continuation-in-part of Ser. No. 457,301, Apr. 2, 1974, abandoned.

[51] Int. Cl.² .................................................. G03C 1/52
[52] U.S. Cl. .......................................... 96/75; 96/67; 96/87 R; 206/411; 206/813; 264/235; 264/342 R; 427/207 D; 427/316; 428/480; 428/913; 528/309
[58] Field of Search ............................ 264/234–235, 264/342 RE, 342 R, 129; 96/87 R, 91 R, 94 R; 206/411, 813; 427/207, 316; 536/76, 85; 260/75 R, 75 T; 428/480, 913

[56] References Cited

U.S. PATENT DOCUMENTS

| | | | |
|---|---|---|---|
| 2,137,601 | 11/1938 | Abrams | 88/17 |
| 2,451,597 | 10/1948 | Wheeler | 264/235 |
| 2,779,684 | 1/1957 | Alles | 264/135 |
| 3,002,222 | 10/1961 | Sevison | 264/345 |
| 3,061,886 | 11/1962 | Seager et al. | 264/346 |
| 3,426,115 | 2/1969 | Taber | 264/160 |
| 3,547,748 | 12/1970 | D'Onofrio et al. | 264/342 RE |
| 3,663,683 | 5/1972 | Czerkas et al. | 264/346 |
| 3,679,458 | 7/1972 | Sorell et al. | 206/411 |
| 3,805,402 | 4/1974 | Aono et al. | 264/235 |
| 3,873,664 | 3/1975 | Curtis et al. | 264/234 |
| 3,939,000 | 2/1976 | Arvidson, Jr. et al. | 96/87 R |

FOREIGN PATENT DOCUMENTS

| | | |
|---|---|---|
| 2142857 | 11/1976 | Fed. Rep. of Germany. |
| 41-14312 | 8/1966 | Japan. |
| 792430 | 10/1974 | United Kingdom. |

OTHER PUBLICATIONS

"SPSE Handbook of Photographic Science and Engineering", Editor–Thomas–Wiley & Sons, N.Y., N.Y., pp. 482–485 –1973.
American National Standard – "Methods for Determining the Curl of Photographic Film", pp. 7–11; 6–1971.

*Primary Examiner*—Jeffery R. Thurlow
*Attorney, Agent, or Firm*—A. P. Lorenzo

[57] ABSTRACT

A heat-tempered film element having a core-set curling tendency and a net core-set curl at least about 15% below that of a similar non-heat-tempered film element is provided by a process which comprises heating a sheet or roll of self-supporting, core-set-prone thermoplastic polymeric film, which is non-coated or is coated with one or more layers on at least one surface, under ambient relative humidity of less than 100%, at a temperature in the temperature range of from about 30° C. up to about the glass transition temperature (Tg) of said polymer for 0.1 to 1500 hours, said heating being continued until the change in the number of ANSI curl units that the resulting film undergoes upon subsequent core-setting at 21° C. and 50% R.H. for 2200 hours is reduced by at least 15%, compared to the change in the number of ANSI curl units untreated thermoplastic polymer film undergoes upon core-setting under like conditions. The process is particularly useful for treating a stock roll of radiation sensitive film element comprising a curl-prone thermoplastic polymeric film support, such as poly(ethylene terephthalate), coated with photographic coating layers, to reduce the shelf-life core-set curling tendency and core-set curl of the element, by as much as 60% of that of corresponding, but non-heat-tempered film element in its non-processed, as well as in its processed, form. The resulting heat-tempered photographic film element is especially suitable for the manufacture of low-curl microfiche (film cards), and of amateur movie film having reduced clock-springing in its processed reverse-wound form.

63 Claims, 10 Drawing Figures

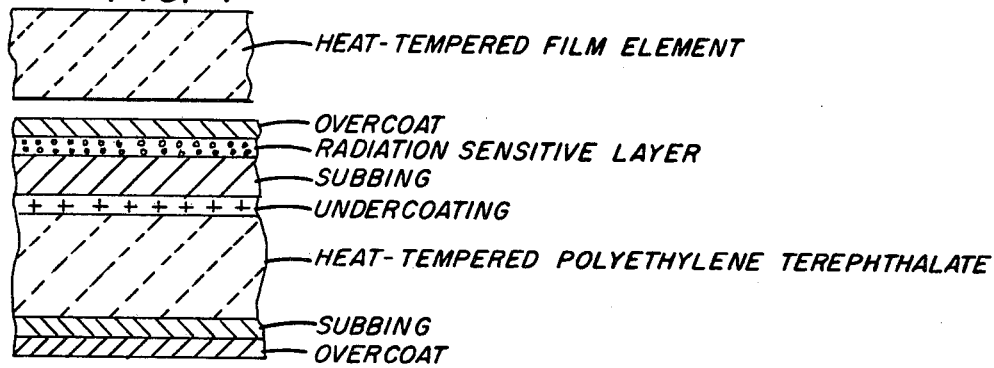
FIG. 4
FIG. 5
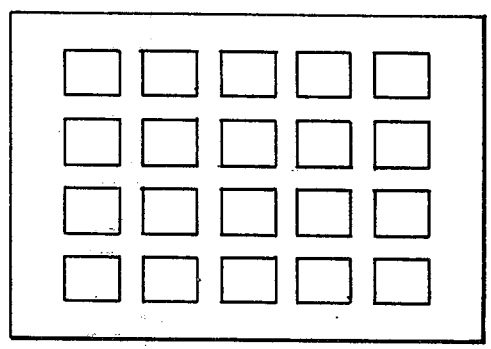
FIG. 6
FIG. 7
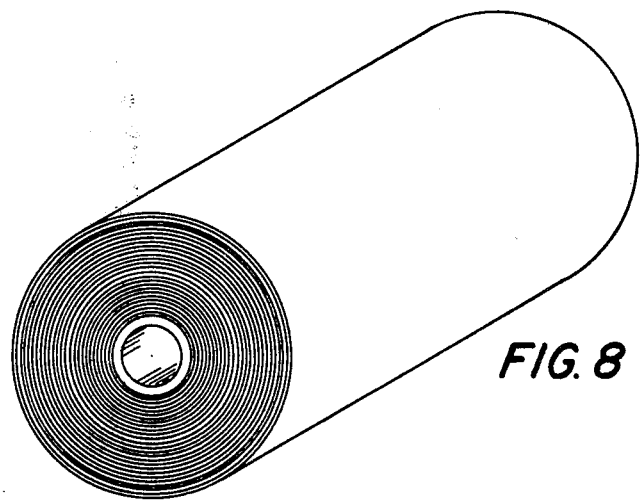
FIG. 8

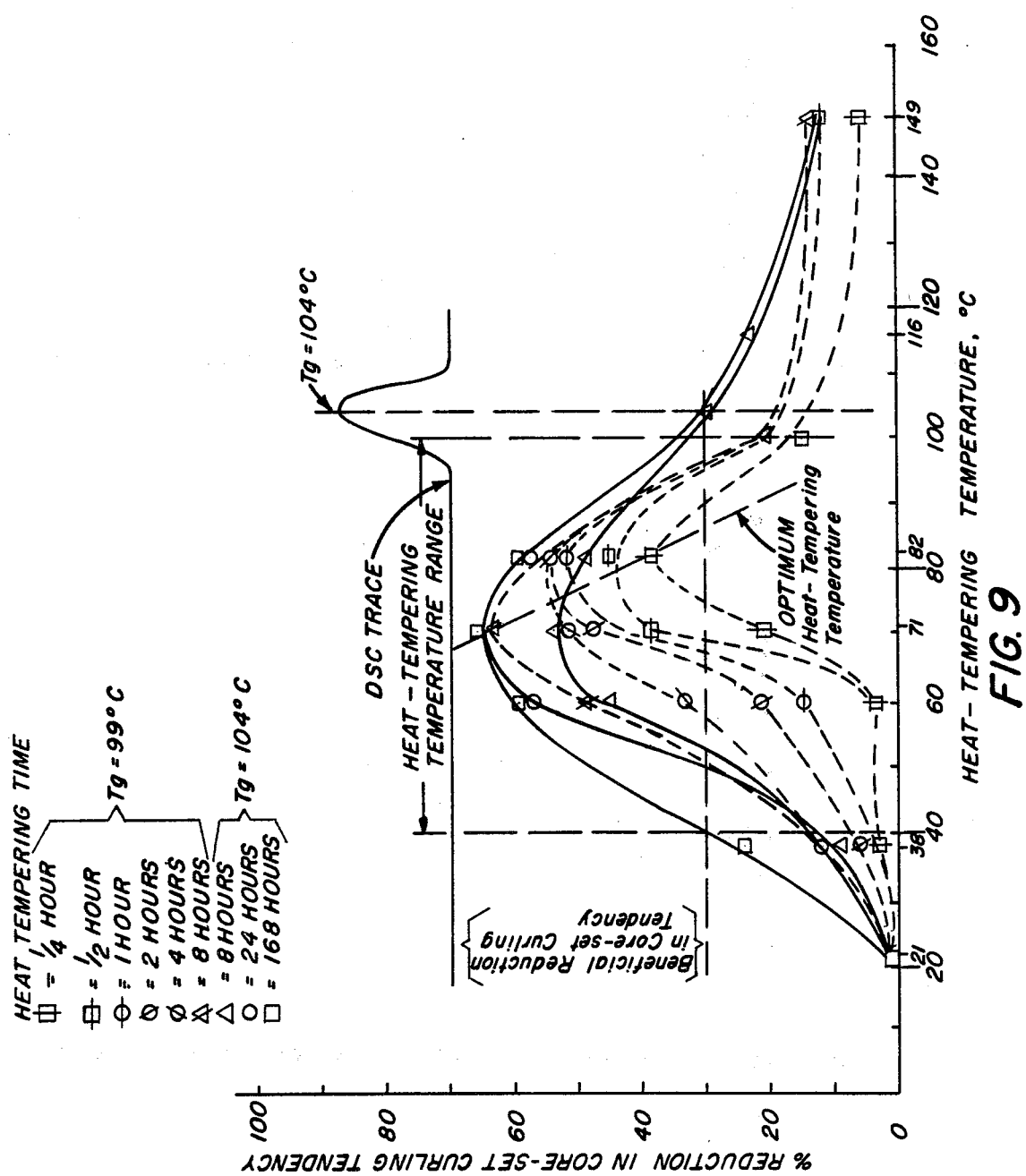

PROCESS FOR REDUCING CORE-SET CURLING TENDENCY AND CORE-SET CURL OF POLYMERIC FILM ELEMENTS

This application is a continuation of Ser. No. 563,882, filed Mar. 31, 1975, now abandoned, which is a continuation-in-part of Ser. No. 457,301, filed Apr. 2, 1974 now abandoned.

BACKGROUND OF THE INVENTION

1. Field of the Invention

This invention relates to a process for reducing core-set curling tendency of a curl-prone polymeric film element, that is, a tendency to acquire a high degree of permanent curl when stored in a wound form. It also relates to a process for reducing shelf-life curl, also called "core-set curl" or, simply, "core-set", in a self-supporting thermoplastic polymeric film element which normally is prone to acquire an undesirable amount of substantially permanent curl in its wound direction, when wound and stored in a rolled form on a winding tube, or core, under ambient temperature and humidity conditions.

It further relates to a coated film element, particularly a radiation sensitive photographic film element, comprising a thermoplastic polymeric support having a relatively low core-set curling tendency, and a relatively low curl. It also relates to a process for making commercially acceptable film elements, such as microfiche (film cards) and cinematographic film, from thermoplastic polymeric film stock material normally having high core-set curling tendency and high core-set and usually provided in roll form.

METHOD FOR DETERMINING CORE-SET CURL AND CALCULATING PERCENTAGE REDUCTION IN NET CORE-SET CURL

The amounts of "core-set curling tendency" and the "core-set curl" with which the invention is concerned are measured and expressed in terms of the "net", or absolute, curl unit values for each of these quantities. Curl unit values may be measured by any acceptable method. One of such methods is that of the American National Standards Institute, Inc., New York, New York, U.S.A. 10018. It is Test Method A ANSI PH1.29-1971, American National Standard Methods for Determining the Curl of Photographic Film, and will be more fully described herein.

In order to predict the amount of curl which a film stored on a roll will develop over a prolonged period of storage time, it is desirable to subject the film to an accelerated storage test from which the predicted amount of curl or change from the predicted amount can be extrapolated. One acceptable procedure for carrying out accelerated core-setting comprises wrapping a sample of film on a 3″ o.d. (outer diameter) core and maintaining it on the core for 24 hours at a temperature of about 49° C. and ambient relative humidity (R.H.) up to 50%. Such an accelerated core-setting and measuring procedure may be carried out as follows:

(a) selecting one surface of the starting film as a reference surface for both starting film and heat-tempered film, said reference surface being a non-coated or coated surface when the film is substantially free of curl, or being a non-coated or coated convex surface at 50% relative humidity when the film has curl, (b) measuring the original curls of said starting and heat-tempered films in ANSI curl units at 21° C. and 50% relative humidity according to Test Method A of ANSI PH1.29-1971 of the American National Standards Institute, (c) designating curl toward the reference surface as positive and curl away from the reference surface as negative, in starting film and in heat-tempered film, (d) winding single turns of each film on test cores of the same outer diameter, with reference surfaces facing inwardly, said outer diameter preferably being smaller than the inner diameter of the heat-tempered roll when the heat-tempering has been done in roll form, (e) storing said wound films for a period of 24 hours at about 49° C. and 50% relative humidity, (f) measuring and designating the curls of the core-set film as in steps (b) and (c), (g) subtracting said core-set film curl value from step (f) for each film from its original curl value of step (b) to determine its net core-set curl value, and (h) calculating the percentage reduction in net core-set curl as follows:

$$\% = \frac{\left(\begin{array}{c}\text{net core-set curl value} \\ \text{of starting film}\end{array}\right) - \left(\begin{array}{c}\text{net core-set curl value} \\ \text{of heat-tempered film}\end{array}\right)}{(\text{net core-set curl value of starting film})} \times 100$$

The accelerated core-set curl values so obtained have been found to correlate substantially directly with actual curl values obtained in storage tests carried out for a 3 month period at 21° C. and 50% relative humidity. By means of this method, one can determine the expected amount of core-set curl one will obtain for a particular film within a certain period of time, e.g. three months.

Additional series of tests under different time-temperature conditions can likewise be carried out to obtain correlations between core-set curl values obtained in an accelerated test and longer or shorter periods of actual storage time at 21° C. and 50% relative humidity. By carrying out the test procedure in accordance with the above method any errors arising from carrying out the core-setting in a temperature effective for heat-tempering are minimized.

In the following disclosure of the present invention, references will be made to core-set curl values measured by the above ANSI method and to core-set curl values obtained by the above accelerated core-setting method. For example, before core-setting, a sample of self-supporting, thermoplastic polymer film cut from a roll of stock material, may have a curl value of 0, measured in ANSI curl units at 21° C. and 50% relative humidity (R.H.) as described in Test Method A of ANSI PH1.29-1971. After the same film has been "core-set" by being maintained in wound condition on a 3″ o.d. core for 24 hours at a temperature of about 49° C. and ambient relative humidity (R.H.) up to 50%, the curl value, measured in ANSI curl units at 21° C. and 50% relative humidity as above, is found to be 20 ANSI curl units. The "net core-set curl", or change in the curl value, then is calculated as 20 − 0 = 20 ANSI curl units. This represents the amount of additional curl the film sample may be expected to develop when stored on the roll for about three months. A sample of a second film of another type having respective values of 0 (before) and 14 (after) under the same testing and core-setting conditions is found to have a "net core-set curl" of 14 ANSI curl units. The second film is then said to have a net core-set curl of 6 ANSI curl units below that of the first film; one can expect it to develop 6 less units of curl during storage on a roll for about 3 months. The "net core-set curling tendency" of the second film accordingly is expressed as being 30% below that of the first film, i.e. $6/20 \times 100 = 30\%$. The net core-set curl of the second film can also be expressed as $14/20 \times 100 = 70\%$ of that of the first film.

The Problem of Undesired Core-Set Curl

The problem of development of undesired amounts of core-set in polymeric film elements during storage in roll form is especially troublesome in the manufacture processing and use of photographic film elements which comprise a high core-set-prone thermoplastic polymeric support material, such as poly(ethylene terephthalate). A high degree of curling tendency, or core-set-proneness, is particularly undesirable when the film element is intended to be used in the form of a flat film product, such as a microfiche. Such a film element, in its usual form, is a substantially flat piece of processed transparent photographic film usually measuring about 4" high and 6" wide, which bears projectionable micro-sized photographic images. Microfiche are widely used in storage and retrieval of information which can be projected and viewed on display panels or screens on projection machines usually referred to as "readers". Efficient making, processing, storing, retrieving, reading and returning to storage of such small film pieces by high speed machines requires a high degree of flatness, or freedom from core-set, in the pieces both at the time of manufacture, and thereafter. Accordingly, this invention is directed in one highly important aspect to the treatment of stock rolls of coated, core-set-prone film elements to render such elements suitable for making microfiche which are substantially permanently flat. In another aspect, it is directed to improved microfiche film elements which have a reduced amount of curl. In still another aspect it is directed to film elements in the form of amateur movie film having a reduced amount of core-set curling tendency in non-processed form, and less clock-springing tendency in reverse-wound processed form.

DESCRIPTION OF THE PRIOR ART

The use of heat processes to modify the physical characteristics of polymeric film elements is well known. For example, in the continuous manufacture of certain thermoplastic film, particularly polyester film by processes involving extrusion from bulk storage of polymer stock material, it is necessary, in order to obtain desired physical properties, such as transparency, tensile strength and dimensional stability, that the usually amorphous, extruded body of film subsequently be heated and worked by prescribed treatments. In such heating and working treatments, the heated film usually is first stretched lengthwise about 2 to 3 times its original length, and then similarly stretched widthwise. The stretching, known also as "cold drawing", is carried out at temperatures below the temperature of melting but above the glass transition temperature of the polymer. The resulting film then is described as being biaxially-oriented. The cold drawing affects some change in the crystallinity of the polymer. Next, to enhance the crystallinity and to increase the dimensional stability of the film, the biaxially-oriented polymeric film is "heat-set" by heating it near its crystallization point, while maintaining it under constant tension. The heating and tensioning also ensure that the heat-set film remains transparent upon cooling.

Films that can be directionally oriented and heat-set, such as poly(ethylene terephthalate), are then also conventionally subjected to a subsequent heat treatment known in the art as a "heat-relax" treatment or step. The temperature at which the film is heat-relaxed must be approximately the "creep temperature" of the particular polymer, which in the case of poly(ethylene terephthalate) (PET) is 130° C. The creep temperature is located in a range above the glass transition temperature range, but below the range at which the heat-setting step is carried out. "Creep" is generally defined as a viscoelastic deformation of a polymer under load. During the above "heat-set" operation, tension is continually applied to the film to ensure that the dimensions of the film are held substantially constant during the "heat-set" treatment. However, during the "heat-relax" treatment, the film is maintained under only a slight tension during the "heat-relax" step (see, for example, details in U.S. Pat. No. 2,779,684). The use of a "heat-relax" step in such overall continuous processes results in a still further improvement in the dimensional stability and surface smoothness of the finished film.

The heat-relax treatment is also conventionally followed immediately by a cooling treatment. In the cooling treatment, the film is moved rapidly through a cooling section of a machine in order to fairly quickly lower its temperature to below the second order transition temperature of the film (also referred to in the polymer art as the glass transition temperature). The film is then in a condition suitable for further handling, including winding of the film into rolls on conveniently sized storage tubes, or "cores". (See, for example, details in U.S. Pat. No. 3,663,683).

Various methods of heat-treating the polymer sheeting may be used for heat-relaxing purposes, such as surface winding the sheeting on a take-up roll or core, and then heating the roll of wound film in an oven. (For details, see U.S. Pat. No. 3,504,075, column 5, lines 50–67.).

Reference to the above discussion of the prior art heat treatment will be helpful in distinguishing the heat-tempering process of the present invention, as disclosed herein, from the prior art treatments.

The term "self-supporting thermoplastic polymer film" is used herein to include (a) non-coated, self-supporting polymeric film, (b) coated, self-supporting polymeric film having one or a multiplicity of layer(s) contiguous to one or both surface(s) of the film, and (c) coated and non-coated, self-supporting film or sheet laminates comprising at least one core-set curl-prone polymeric film bonded to one or a multiplicity of sheet(s) of core-set curl-prone polymeric film(s) or to one or a multiplicity of sheet(s) of other laminatable material(s). Such a film can vary in thickness, but generally it will have a thickness of about 2 to 50 mils (0.002 inch to 0.050 inch), preferably about 2 to 10 mils, most preferably 2.5 to 8.5 mils.

Self-supporting thermoplastic polymer film is affected at all stages of its life by the existence in the element, particularly in the polymeric material itself, of an inherent tendency to acquire a "set" on aging. The "set" may be referred to in the art as "core-set" when the set conforms to a core or tube on which it has been wound and stored. The "set" can also occur in the absence of a core, for example, when the film is rolled without a supporting core. The term "core-set" as used herein refers to both forms of "set". Accordingly, "core-set" may be explained as the result of plastic flow deformation imparted to self-supporting thermoplastic polymer film when it is wound, and especially when it is wound, on a core and stored at ambient conditions of temperature and humidity for a period of time sufficient for the film to acquire a substantially permanent curvature in the direction of its winding on the core. Core-set increases with an increase in storage temperature and with a decrease in roll diameter.

The present invention is concerned especially with core-set prone poly(ethylene terephthalate) film in coated form such as in the forms of information receiving elements used in image-recording. The invention will be exemplified with coated and non-coated self-supporting polymeric film elements which comprise poly(ethylene terephthalate) as a base or support material for radiation sensitive and other coated layers present in a photographic element. It is to be understood, however, that the discussion throughout this disclosure is intended to apply also to other coated and non-coated self-supporting, core-set-prone thermoplastic film elements, as is disclosed herein.

Conventionally, during its manufacture, biaxially-oriented, heat-set, heat-relaxed poly(ethylene terephthalate) film, after cooling, is wound tightly and smoothly onto cores having outside core diameters of about six inches to twelve inches to form stock rolls of film that can be stored and readily handled. The fully-wound rolls of film may have outside roll diameters of 24 inches to 36 inches, more or less. The rolls usually preferably are stored indoors and shipped at ambient temperature and humidity conditions, which usually are in the range of 60°-90° F. (about 15°-32° C.) and 15-75% relative humidity.

The rolled film subsequently may be unwound from the rolls onto cores of larger or smaller outside diameters, or may be used directly from the storage rolls, for application thereto of coated layers, for manufacture of slit or cut film or for a wide variety of other purposes. When the film element has been coated with radiation sensitive materials and other coatings used in manufacture of photographic elements, the coated film may be rewound onto smaller spools for use in still and amateur movie cameras. It may be unwound and rewound during processing of exposed photographic film into and out of processing baths. The processed film may also be cut to various sizes, for use as microfiche, for example.

A high degree of core-set, or permanent curl, in poly(ethylene terephthalate) film is a desirable physical characteristic for some commercial and industrial applications. For example, as taught in U.S. Pat. No. 2,852,143, polyester film manufactured by E. I. duPont de Nemours & Co. under the trademark "Mylar" is used in the form of a permanently curled, i.e. "coil-set", display device. In making the coiled device, the principle of core-setting inherently is utilized. The coiled film strip device of the patent is made permanently coil-set as in a method taught in U.S. Pat. No. 3,426,115 for making a self-coiling film-sized sheet. The method of the latter patent comprises coiling a sheet of poly(ethylene terephthalate) film having a melting point between 250° and 255° C. and a thickness of about 0.0075 inches (7.5 mils), then heating the coiled sheet to a point near, but below, the melting point, and then cooling the coiled sheet. The heating is described as being carried out to a temperature at which internal stresses due to coiling are relieved, but below that at which plastic flow and deformation of the sheet takes place.

Permanent curl is also desirable in certain film elements used in the photographic arts. For example, U.S. Pat. No. 2,137,601 teaches subjecting rolled film, intended for use in cameras, to a temperature in excess of any it may encounter in ordinary usage, in order to cause the emulsion, which is present on one surface of the film, to soften and reset itself on the film, so that the film is given an inherent tendency to curl under normal handling and storage teperatures. The film is then rewound, with its outer convolutions innermost so that the exaggerated curvature of the innermost convolutions (now outermost) seek to maintain the roll in a close wound condition at all times thereafter. The film is thereby given a permanently "set" curl, which is advantageous for introducing the film into a camera and using it without need for a reel or spool.

Other patents teach use of heat-treating methods for heat-relaxing films of thermoplastic resins, which have been stored in roll form, to remove wrinkles, mottling and other surface defects arising from winding or storage of the rolled film. For example, as to the latter practice, Japanese Official Patent Publication No. 41-14312 (14312/66) teaches a method for reform-processing stretched poly(ethylene terephthalate) film. According to the patent, a flawless and flat film is made by applying limited tension to poly(ethylene terephthalate) film while it is being stretched and wound on a roll during processing, meantime allowing the film to pass through a set of rollers being heated at a given temperature. The film may be heated at a temperature range between the temperature resulting from frictional heat generated by rollers during application of stress and a temperature about 45° C. higher than said stress temperature, preferably about 35° C. higher. In the case of two-dimensionally stretched poly(ethylene terephthalate) film (thickness $25\mu$) which had wrinkles on the film surface, the thermal stress temperature was found to be 85° C. (185° F.). In order to reform the film, a roller temperature of 130° C. (266° F.) was found necessary, at an applied tensile force of 5.0 kg.

The present invention comprises heat-treating of film elements under different conditions and for a different purpose than are taught or suggested by such prior art patents or other teachings.

SUMMARY OF THE INVENTION

The invention relates to a process which comprises heat-tempering coated or non-coated, core-set prone, self-supporting thermoplastic polymer film for a period of from about 0.1 to 1500 hours to reduce the shelf-life, or storage aging, core-set curling tendency characteristics and the amount of core-set curl of the resulting heat-tempered film element. It also relates to heat-tempered film elements exhibiting a lower degree of core-set curling tendency and a lower core-set curl value, relative to corresponding non-heat-tempered film elements, which can be obtained from this process.

In one of its aspects, the invention is a method for reducing core-set curling tendency which comprises:

(i) providing a curl-prone, self-supporting thermoplastic polymer film having a thickness of about 2 to 50 mils and a Tg above about 60° C. determined in a differential scanning calorimeter at a heating rate of 20° K./min. and, (ii) heating said thermoplastic polymer film at an ambient relative humidity less than 100% and a temperature in the range of from about 30° C. up to the Tg of said polymer, said heating being continued for about 0.1 to 1500 hours until the change in the number of ANSI curl units that the resulting film undergoes upon subsequent core-setting at 21° C. and 50% R.H. for 2200 hours is reduced by at least 15%, compared to the change in the number of ANSI curl units that said thermoplastic polymer film which has not been subjected to step (ii) undergoes upon core-setting under like conditions.

In another aspect, the invention is a method for making a self-supporting thermoplastic polymer film having a reduced core-set curling tendency which method comprises:

(i) providing in a substantially flat form or in the form of a roll of at least about 4 inches (10.2 cm) inner diameter a curl-prone, self-supporting thermoplastic polymer film having a thickness of from about 2 to 50 mils and having a glass transition temperature of above about 60° C. determined in a differential scanning calorimeter at a heating rate of 20° K./min., said film being non-coated or being coated with at least one coating layer, which may be a radiation sensitive layer, on at least one surface thereof, (ii) heating said thermoplastic polymer film at an ambient relative humidity less than 100% and a temperature in the range of from about 30° C. up to the Tg of said polymer, said heating being continued for about 0.1 to 1500 hours until the change in the number of ANSI curl units that the resulting film undergoes upon subsequent core-setting at 21° C. and 50% R.H. for 2200 hours is reduced by at least 15%, compared to the change in the number of ANSI curl units that said thermoplastic polymer film which has not been subjected to step (ii) undergoes upon core-setting under like conditions, said core-setting and curl measuring preferably being carried out by the following procedures:

(a) selecting one surface of the starting film as a reference surface for both starting film and heat-tempered film, said reference surface being a non-coated or coated surface when the film is substantially free of curl, or being a non-coated or coated convex surface at 50% relative humidity when the film has curl, (b) measuring the original curls of said starting and heat-tempered films in ANSI curl units at 21° C. and 50% relative humidity according to Test method A of ANSI PH1.29-1971 of the American National Standards Institute, (c) designating curl toward the reference surface as positive and curl away from the reference surface as negative, in starting film and in heat-tempered film, (d) winding single turns of each film on test cores of the same outer diameter, with reference surfaces facing inwardly, said outer diameter preferably being smaller than the inner diameter of the heat-tempered roll when the heat-tempering has been done in roll form, (e) storing said wound films for a period of about three months at about 21° C. and 50% relative humidity, (f) measuring and designating the curls of the core-set film as in steps (b) and (c), (g) subtracting said core-set film curl value from step (f) for each film from its original curl value of step (b) to determine its net core-set curl value, and (h) calculating the percentage reduction in net core-set curl as follows:

$$\% = \frac{\left(\begin{array}{c}\text{net core-set curl value}\\\text{of starting film}\end{array}\right) - \left(\begin{array}{c}\text{net core-set curl value}\\\text{of heat-tempered film}\end{array}\right)}{(\text{net core-set curl value of starting film})} \times 100$$

By practice of the invention, the shelf-life core-set curling tendency of a core-set-prone thermoplastic polymeric film can be substantially reduced by heat-tempering, by as much as one-half and more, from that expected for a corresponding non-heat-tempered film. The core-set curl value of the heat-tempered core-set film is simultaneously reduced many curl units.

The heating preferably is done within a narrow temperature range at about an optimum heat-tempering temperature within a broad temperature range which is below the glass transition temperature (Tg) of the polymeric material of which the film element is comprised. The specific temperature ranges and the optimum heating temperature within the above ranges used to reduce core-set in a given film element are subject to variation and are dependent somewhat on the composition of the particular film element. The values for the above ranges and optimum temperature for a particular polymeric film element to be heat-tempered can be readily determined as described later herein.

It has been found also that heat-tempering of the film element above or below the optimum temperature in the aforementioned temperature range provides less reduction of core-set curling tendency and, in the case of heat-tempered film, in loss of the benefits and advantages gained from the heat-tempering treatment. Heating the film element into and above the glass transition temperature range restores substantially all of the original shelf-life core-set curl tendency to the element. For example, heat-tempering a sample of a core-set prone, subbed, 7 mil thick, biaxially-oriented, heat-set, heat-relaxed, poly(ethylene terephthalate) film element by heating it in flat form at a temperature of about 82° C. (180° F.) for 24 hours reduces core-set curling tendency of the film, when later rolled and stored on a 3" o.d. storage core, to about 33% of that of a sample of a similar non-heat-tempered poly(ethylene terephthalate), the curl values being measured as described above in ANSI units for curl values, and as discussed in detail herein. This amounts to a reduction of 67% in core-set curling tendency of the heat-tempered film relative to the non-heat-tempered film. In comparison, if the heat-tempering of another sample of the same poly(ethylene terephthalate) is done by heating at a temperature of 100° C. (212° F.), a lesser degree of reduction in core-set curling tendency results. In the latter case, a reduction to about 58% of the expected core-set curling tendency is attained, equal to a 42% reduction in curling tendency. If the heat-tempering of yet another sample of the same polymer is done at 120° C. (248° F.) the core-set curling tendency then is still as much as 77% of its original (non-heat-tempered) level, equal to only a 23% reduction in curling tendency.

Therefore, it is seen that most of the advantages and benefits of the invention are lost as the specific temperature or temperatures at which heat-tempering is carried out approaches, or is within or above, the glass transition temperature range.

The heating during the process of this invention preferably is carried out at substantially a constant temperature during the entire heat-tempering period, after the film body has been brought to the desired optimum heat-tempering temperature range. The heat-tempered film can then be cooled to ambient temperature without substantial loss of the enhanced core-set properties.

The advantages and benefits of the process are obtained by heat-tempering the film element either in sheet or in roll form. The invention is most advantageous for the treatment of film elements in roll form. Accordingly, in a preferred embodiment, this invention relates to the heat-tempering of a core-set-prone, self-supporting thermoplastic resin film element in a roll-wound stock material form on a core, or roll, to render the film resistant to later shelf-life core-set curl.

More preferably, the invention comprises heating a stock roll of biaxially-oriented, heat-set, and heat-relaxed poly(ethylene terephthalate) film, in coated or non-coated form, wound on a core of at least about three inches in diameter by heating the roll of film at a temperature in the range from above about 30° C. to within a few degrees of the glass transition temperature of the poly(ethylene terephthalate), for about 0.1 to 1500 hours until a sample of the resulting heat-tempered film is found in accordance with the above prescribed core-setting and curl measuring procedures to have attained a reduced degree of change in curl value (net core-set curl after heat-tempering) which is at least about 30% below the degree of change in curl value undergone by a sample of the starting film (net core-set curl before heat-tempering) when samples of each film are core-set at 21° C. and 50% relative humidity for a period of 2200 hours, about three months, and then cooling the heat-tempered film element to ambient room temperature.

A poly(ethylene terephthalate) film element used in practicing the process is advantageously, and preferably, in the form of a photographic film support. Because of the hydrophobic character of poly(ethylene terephthalate), such film support usually comprises adhesion-promoting layers on its surfaces, at least one of those layers being a hydrophilic, e.g. gelatin-containing subbing layer coated over a hydrophobic undercoat. In practicing the invention with a roll-wound film, it has been found that such a subbing layer may be required on one surface if only a hydrophobic adhesion-promoting layer is present on the other surface of the element. The gelatin containing subbing layer aids in preventing sticking of the overlying surfaces of the wound film to one another and provides a means for adhering additional layers to the film element. Also, the process can be practiced successfully with subbing layers present on both surfaces of the rolled support, or even with no layers of any kind on either surface. The surfaces can also be kept separate by interleaving means.

As is known in the photographic film manufacturing art, the presence of a gelatin, or other hydrophilic coating or subbing layer on one surface of a hydrophobic film will cause the film to curl toward the coated surface when humidity is decreased due to loss of moisture in the coating layer. The presence of such a hydrophobic layer must be taken into account in making comparisons of curl values. Accordingly, curl values as discussed herein are always referenced with respect to a particular relative humidity. For convenience of comparison, values at 50% relative humidity are used in order to minimize the effects of abnormal ambient relative conditions.

A poly(ethylene terephthalate) film element which can also be used as a stock material for the practice of this invention is a multi-layered radiation sensitive photographic film element comprising a non-heat-tempered poly(ethylene terephthalate) support and at least one radiation sensitive layer which is a photographic emulsion layer, e.g., a silver halide emulsion layer, or a diazo layer. Such a film element can be subjected to the heat-tempering process of this invention to provide a heat-tempered multi-layered radiation sensitive photographic film element having as little as 36% of the core-set curling tendency of the non-heat-tempered film element, after exposure and processing of the respective films for microfiche or amateur movie film applications. The core-set curl value of the core-set film will be correspondingly less than that of similarly exposed and processed, non-heat-tempered, photographic film element.

In an article embodiment, the invention relates to a heat-tempered, self-supporting thermoplastic polymer film of which a sample, when subjected to the above discussed prescribed core-setting and measuring procedure, increases in net core-set curl value to no more than 85% of the net core-set curl value of corresponding non-heat-tempered film, when samples of each film are core-set at 21° C. and 50% relative humidity for a period of about three months.

In another article embodiment, the invention relates to a heat-tempered, self-supporting thermoplastic polymer film of which a sample, when subjected to the above discussed prescribed core-setting and measuring procedures, increases no more than 14 ANSI curl units in net core-set curl value.

In yet another aspect, the invention relates to a process for making improved, low curl microfilm elements, and to the improved, low curl microfiche made therefrom, both in unprocessed and processed forms. It also relates to a process for making improved, low curl cinematographic film, and to the improved low clock springing amateur movie film so made.

In determining curl values herein, the amount of curl is measured in accordance with Test Method Number ANSI PH1.29–1971 of the American National Standards Institute, Inc., New York, N.Y. and is expressed in ANSI curl units, as herein described.

BRIEF DESCRIPTION OF THE DRAWING

This invention is further illustrated by reference to the accompanying drawing in which:

FIG. 4 is a diagrammatic cross-sectional view of a flat heat-tempered film element free of any coated layers;

FIG. 5 is a diagrammatic cross-sectional view of a flat, coated radiation sensitive element having a heat-tempered support;

FIG. 6 is a plan view of a flat microfiche made with a heat-tempered support;

FIG. 7 is a side view of the flat microfiche of FIG. 6;

FIG. 8 is a diagrammatic view of a roll of heat-tempered subbed film element wound on a core;

FIG. 9 is a chart showing effects of heat-tempering time and temperature on core-set curling tendencies of poly(ethylene terephthalate)s having different glass transition temperatures (Tg) and additionally shows a differential scanning calorimeter trace (DSC trace) superimposed on the chart to indicate the relationship of a glass transition temperature (Tg = 104° C.) to the heat-tempering temperature range.

DESCRIPTION OF THE PREFERRED EMBODIMENTS

Figure 1:
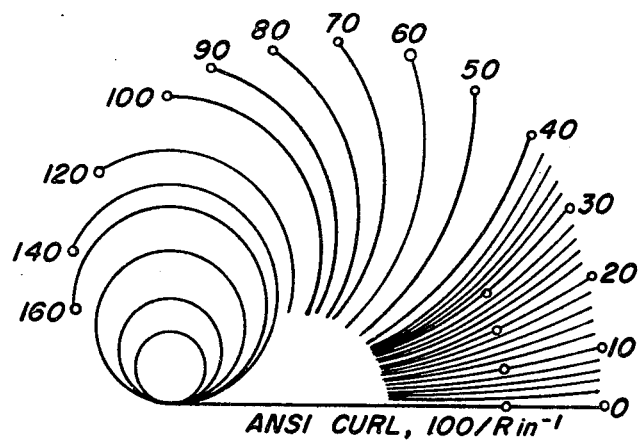
FIG. 1 is a reproduction of an ANSI curl chart used to measure curl values.

According to the process of the present invention, directionally-oriented, heat-set, heat-relaxed, roll-wound, 2 to 50 mil thick poly(ethylene terephthalate) film element (and similarly other self-supported polymeric film materials used in the photographic arts) can be heat-tempered at a temperature essentially below its glass transition point (Tg) in an economically practical time period to reduce the inherent, shelf-life core-set curling tendency of the element to an amount of about 30% to about 65% of its original, non-heat-tempered, shelf-life core-set curling tendency, as measured on an ANSI chart and as expressed in ANSI curl units. The net core-set curl is comparably reduced also.

This discovery that heat-tempering must be done essentially below the glass transition temperature of the polymer in order to obtain a substantial reduction in core-set curling tendency and in net core-set clearly distinguishes the present invention from teachings or suggestions of the prior art patents discussed herein.

The invention further is based on the discovery of advantageous combinations of times and temperatures which provide a method for predetermining the amount of core-set curling tendency reduction and the actual and net amounts of core-set curl which one can expect to obtain with a certain combination of conditions. It further is based on the discovery of optimum time-temperature conditions which provide the maximum reduction in core-set curling tendency and in the lowest amount of core-set curl which one may expect to obtain in heat-tempered polymeric film during prolonged shelf-life storage, e.g. from one month and even up to a period of about one year. For example, it has been found that in order to obtain a 30 to 65% reduction in core-set curling tendency, as referred to above, heat-tempering of a 7 mil thick sheet of the above poly(ethylene terephthalate) (Tg = 104° C.) is carried out at a temperature of from about 40° C. (104° F.) to about 100° C. (212° F.) for from about 24 to 168 hours. The core-set curl (3" o.d. core) of the core-set heat-tempered film is found to be from about 10 to 20 ANSI curl units less than that of otherwise identical corresponding non-heat-tempered polymeric film.

In general, the time and temperature used in carrying out the process are pre-determined to obtain a time-temperature combination of conditions which provides a desired degree of reduction in core-set curling tendency and a desired amount or degree of reduction in actual curl in heat-tempered, core-set polymeric film in a minimum amount of time. In the case of poly(ethylene terephthalate) of the kind usually used as a base, or support, for manufacture of photographic film elements, the heat-tempering according to the process beneficially may be carried out in a heating, or heat-tempering, temperature in the temperature range extending from about ambient room temperature, e.g. above about 38° C. (100° F.), to about 5° C. degrees below the Tg of the polymer. Preferably, the heat-tempering will be carried out at a temperature of from about 60° to 95° C. (145° to 203° F.), for from about ¼ to 24 hours, thereby to obtain a reduction in core-set curling tendency amounting to about 40 to 65%. The total time period will depend on many variables, such as, for example, the overall diameter and width of rolled film stock, or the thickness of the film element sheet; the efficiency of heat transfer into the body of film element; the form of heat energy supplied; the core size and core material on which the film is wound; the presence or absence of wrapping material on the element when it is in roll form; stability of coatings present, e.g. those on radiation sensitive film elements, to heat and humidity; the relative humidity of the heat-tempering atmosphere, and the like.

A sheet of 7 to 10 mil thick poly(ethylene terephthalate) (Tg = 104° C.) film element when heated in a most preferred heat-tempering temperature range, 65° to 90° C. (149° to 194° F.), will be heat-tempered to a condition of 50% reduced core-set curling tendency in from 2 to 4 hours. Less than optimum, but still beneficial, e.g. a reduction of 15–20% in core-set curling tendency has been obtained in as little as 0.1 hour of heat-tempering of a sheet of the same film element at about 71° C. (160° F.).

In the case of rolled stock material, a longer period of heat-tempering time will be required, in order to provide for lag time in heat transfer. Usually, with all factors being favorable to good heat transfer, a 24" outside diameter (o.d.) stock roll of radiation sensitive film element comprising a poly(ethylene terephthalate) support of about 3 to 10 mils thickness wound on a 6" to 10" o.d., rigid core of about 60" length will be found, upon heating in a chamber held at about 82° to 93° C. (180° to 200° F.) and ambient relative humidity, with heated air circulation, to reach a chosen heat-tempering temperature range of about 71° to 82° C. (160° to 180° F.) in about 24 to 72 hours of heating up from about 21° C. (70° F.) room temperature storage conditions. After the chosen heat-tempering temperature is reached, the heated roll need be held additionally at the heat-tempering temperature range for only so long a time period as is necessary to obtain a desired degree of reduction (e.g. up to about 65%) in shelf-life core-set curling tendency.

In the case of a stock roll of radiation sensitive film element material of the type described above, a 60–65% reduction of the shelf-life core-set curling tendency may be expected to result in from 8 to 24 hours of additional heating in the heat-tempering temperature range, e.g., at 71° to 82° C. (160° F. to 180° F.). (roll temperature). Total time in the heating chamber for heating purposes will then range from about 32 to 98 hours. In the case of larger rolls of similar radiation sensitive film element, of about 30" to 36" o.d., the heat-tempering time-period may range up to about 7 days, more or less, again depending on the existence of variable conditions as discussed above, with a comparably longer time being required for heating up to the optimum heat-tempering temperature. The inner temperature of the roll may be determined in any known way, e.g. by use of interleaved thermocouples.

If less than the optimum degree of core-set curling tendency reduction of a particular polymeric film is desired, the heat-tempering can be carried out at a lower, or even higher, temperature than the determined optimum heat-tempering temperature, by selecting an appropriate heat tempering temperature below the Tg of the polymer from a heat-tempering temperature range curve or chart determined by tests as herein described.

After the heat-tempering treatment of the roll of material is completed, the roll is removed from the heating chamber in which it was heated. The roll is then allowed to cool. Preferably, it is placed in a storage area at ambient room conditions wherein the time period required to cool it will be about the same as its heat-up period. It also may be found advantageous, in some cases where the core-set curl of the heat-tempered core-set film is still unacceptably high for a particular intended use to rewind the hot, heat-tempered film with the convex surface innermost onto another core, thereby obtaining an additional benefit arising from the reduction of curl in the film by such "reverse winding" of the hot film. The heat-tempered film can also be cooled and rewound from its stock core by unwinding the hot film, after it leaves the heating chamber, and passing it over chilled rolls to rapidly remove the heat from the film. The latter procedure will permit use of the cooled film almost immediately in subsequent coating or slitting operations.

The humidity at which the heat-tempering is carried out in practicing the process is subject to variation. In order to obtain optimum heat transfer without adversely affecting coating layers of a coated film element, it will be advantageous to carry out the heating in an oven atmosphere having a low relative humidity (R.H.), e.g. in the range of 10 to 25%, preferably about 15 to 20% R.H.

At this point, to aid in the understanding of the invention, the terms "glass transition temperature" and "core-set curl" as used herein, and the tests used in their determinations, are described in greater detail.

Determination of Glass Transition Temperature as Process Guide

At sufficiently low temperatures all amorphous polymers or polymer regions of semicrystalline polymers are known to assume characteristics of glasses, such as hardness, stiffness and brittleness. Polymers in the glassy state are further characterized by a low volume coefficient of expansion, when compared with that of the polymer in the fluid state. In this respect polymers in the glassy state resemble crystalline polymers which are also characterized by a low volume coefficient of expansion. The temperature interval at which the volume coefficient of expansion of the amorphous polymer changes from a high to a low value is the glass transition temperature range. The glass transition temperature of a polymer cannot be properly defined as a specific temperature value, although this is frequently done in the literature. In fact, the glass transition temperature of a polymer is rate-dependent, i.e. it is dependent on the rate of heating or cooling of the polymer sample during the analytical determination of the volume coefficient of expansion. The faster the rate of heating or cooling of the polymer sample during this analysis, the wider will be the range of glass transition temperature. The opposite relationship pertains, when the sample is heated or cooled slowly. In view of this rate dependence, specific glass transition temperature values refer to the midpoint of the glass transition temperature range on the endothermic peak of a polymer. The above-mentioned physical properties of amorphous polymers are the result of the fact that large-scale motions of the chains of a polymer below its glass transition temperature range cannot take place to any great extent. It has, however, to be added, that, although the glassy polymer is not fluid, its chains retain some residual segmental mobility. For a discussion of the phenomenon of the "glass transition temperature" of polymers, see e.g. pages 198–204 of F. W. Billmeyer, Jr., Textbook of Polymer Science, Interscience Publishers, Division of John Wiley and Sons, New York (5th printing, August 1970).

The glass transition temperature of a polymer may be determined by differential thermal analysis, preferably by the use of a "differential scanning calorimeter" (DSC). For a detailed description of this analytical method see "Thermal Analysis", Vol. I of the series "Techniques and Methods of Polymer Evaluation", edited by P. E. Slade and L. T. Jenking, Marcel Dekker, New York, 1966. The DSC procedure for following the changes in the thermodynamic state of a glassy polymer that is based on an analysis of the interrelationship between the absorption of thermal energy in the glass transition temperature range (i.e. the region of the endothermic peak) and the rate of heating during the heating cycle of a heat-tempered, glassy polymer, is particularly suitable. (See S. E. B. Petrie, Journal of Polymer Science, Part A-2, Vol. 10, pages 1255–72, 1972.) The DSC procedure of Petrie makes use of the fact that a glassy polymer heated at a rate faster than the rate at which it is cooled, or is annealed below the glass transition temperature, and is subsequently heated, will exhibit an endothermic peak superimposed on the specific heat increment normally associated with the glass transition temperature. The DSC curve is representative of the measurements of the changes in the heat capacity of a polymer during controlled heating or cooling through the glass transition temperature range. The value of the transition temperature (Tg) of a polymer increases with its degree of crystallinity. In the literature the glass transition temperature of commercial poly(ethylene terepthtalate) has been reported to be about 67° C. (152° F.) for the amorphous polymer, about 81° C. (178° F.) for crystalline, nonoriented polymer and about 125° C. (257° F.) for high crystalline, biaxially oriented polymer.

Poly(ethylene terephthalate) used for making photographic film supports and used as a starting material in the examples herein is a biaxially-oriented, heat-set, heat-relaxed polymer which is semi-crystalline. Such poly(ethylene terephthalate) usually has an intrinsic viscosity (I.V.) in phenol:chlorobenzene in about 60:40 weight ratio of from about 0.62 to 0.65 deciliters per gram determined at about 25° C. in solution containing about 0.5g. of polymer per 100 milliliters of phenol:chlorobenzene. Glass transition temperatures for such polymers have been determined by the DSC method as described by Petrie above, to be about 99°–107° C. (219°–225° F.), measured after heating (or annealing) the poly(ethylene terephthalate) for about 72 hours at 81° C. in accordance with the invention. In comparison, a similar sample of poly(ethylene terephthalate) which had been heat-tempered 100 days at 71° C. (160° F.) was found by the DSC method to have a glass transition temperature of 112° C. (234° F.). Thus it is seen that time and temperature of annealing affect Tg.

The exact value of the glass transition temperature (Tg) is dependent also on the rate of the controlled heating used in the DSC method. The above experimentally measured Tg values and all other Tg measurements made as described herein were obtained with a heating rate of 20° K./min.

Determination of the glass transition temperature for the purposes of the present invention is carried out primarily to establish a readily recognized upper temperature limit below which heat-tempering according to the present invention is beneficially carried out.

Precise measurement of the glass transition temperature of a semi-crystalline polymer before it has been heat-tempered, by noting the region of a rapid change in heat capacity, is extremely difficult. However, it has been found that the measurement more readily can be made if the polymer first has been heat-tempered at or near the optimum heat-tempering temperature for the polymer. Determination of the optimum heat-tempering temperature and of the heat-tempering temperature range is somewhat involved and is discussed more fully in connection with Example 1 hereof. At this point, it is intended only to show the relationship of Tg to the heat-tempering temperature range. (See FIG. 9). When the heat-tempering temperature range and the optimum heat-tempering temperature of a polymer have been determined as described in Example 1, a sample of the polymer which has been heat-tempered in the optimum heat-tempering temperature range can be prepared for use in more accurately determining Tg for use as a future upper limit.

For example, a 10 mg. sample of the above polymer, e.g., 7 mil poly(ethylene terephthalate) film, having I.V. of about 0.62, taken from a stock roll of non-heat-tempered film to be heat-tempered, is placed between glass plates at a temperature in previously determined optimum heat-tempering temperature range, e.g., at about 80° C. (176° F.) for about 72 hours, thereby causing the film to become heat-tempered. The glass transition temperature of this heat-tempered sample of polymer then is measured by obtaining a DSC trace, following a standard procedure, preferably that of Petrie, above. The glass transition temperature read from the endothermic peak of the DSC trace is then used as a practical guide to the upper limit of beneficial temperatures to be used for heat-tempering the roll of non-heat-tempered polymeric film. Usually, in the case of poly(ethylene terephthalate) film element used in the Examples hereof, the optimum heat-tempering temperature will be as much as about 30° C. below Tg, as determined on a heat-tempered sample of poly(ethylene terephthalate) having an I.V. of about 0.62.

As discussed above, it has been found that in order to obtain and retain the desired reduction of at least 30% in shelf-life core-set curling tendency the polymeric film should not be heated at a temperature extending into its glass transition temperature range. If heat-tempering is done at a temperature in or above the glass transition temperature, the core-set curling tendency of the polymeric film is not reduced below about 70 to 85% of its original core-set curling tendency. Furthermore, it has been found that distortion and shrinkage of the film may occur if heat-tempering is done at or even a few degrees above the glass transition temperature. Furthermore, after the film has been heat-tempered at the optimum temperature, the reduction in core-set curling tendency will be lost progressively if the film is then heated above that temperature approaching the Tg.

After the glass transition temperature (Tg) of heat-tempered polymeric film has been determined by making a DSC trace of samples thereof as described above, the glass transition temperature is used as a practical guide for the subsequent heat-tempering of production-sized quantities of polymeric film. The heat-tempering then can be carried out at a beneficial temperature sufficiently below the DSC traced glass transition temperature for a period of time sufficient to provide a desired degree of reduction of shelf-life core-set curling tendency in an optimum, i.e. efficient, period of heat-tempering time. For example, as shown above, the glass transition temperature for the poly(ethylene terephthalate) sample which had been heat-tempered for 72 hours at 81° C. was found to be 104° C. From the data of Example 1, and as shown in FIG. 9, it is seen that the beneficial results of the heat-tempering are decreased substantially at about 100° C. heat-tempering temperature. As a practical guide, then the maximum heat-tempering temperature to be used for this lot of poly(ethylene terephthalate) film should be no higher than about 4°-5° C. below its Tg of 104° C. for 72 hours or less, in order to obtain from about 30 to 65% reduction in core-set curling tendency over that of non-heat-tempered film. Preferably, the time of heating will be long enough to obtain a shelf-life core-set curling tendency reduction of at least 30% from that of non-heat-tempered poly(ethylene terephthalate), measured in ANSI curl units by the ANSI method referred to above. In accordance with the invention, and as more fully discussed below, the heat-tempering temperature range at which the optimum core-set curling tendency reduction is obtained will differ for different polymeric films due to their respective glass transition temperatures.

In summary, the beneficial broad temperature range for practice of the invention will be from about 4° to 66° C. below the glass transition temperature (Tg = 104° C.) of a usual poly(ethylene terephthalate) film as determined by a rapid change in heat capacity and/or an endothermic peak of a Differential Scanning Calorimeter trace.

Determination of Core-Set and Core-Set Curling Tendency

As discussed earlier, practice of the invention results in reduction of the shelf-life core-set curling tendency of thermoplastic film by about 30 to 65% or more of its non-heat-tempered value in ANSI curl units. The phenomenon of core-set will be discussed herein particularly with respect to a coated film, especially radiation sensitive film element such as photographic film element; but it is to be understood that the core-set phenomenon occurs also with other self-supporting thermoplastic film elements having no coating on either surface, or coating on one or both surfaces. As is known in the art, core-set is especially troublesome in film elements having more coated layers contiguous to one surface than to the other. Sensitized photographic film elements are especially representative of this latter type.

Photographic film elements usually comprise a polymeric film base coated with several extremely thin layers of photographic coating materials, each because of its chemical nature differing from the other in its dimensional response to moisture and heat. The varying stresses of the layers making up the product will, therefore, tend to cause the film element to assume a flat or curved shape governed by the equilibrium of the forces exerted by the layers. These stresses, and the resulting amount of curl, will be changed as the temperature and humidity conditions of the surrounding atmosphere are changed. Therefore, although the core-set curling tendency of the polymeric film base itself is a significant force in causing curl, and can be the controlling factor in curling tendency of a sensitized photographic film element, the presence of coated layers on the base can cause problems, especially when the layers contain hygroscopic materials.

The deformation, or curl, of a film element is not necessarily reversible when the surrounding conditions are returned to the starting point, nor is it always the same for a given product, because the past history of the specimen's association with varying conditions may alter its response to these variables. Consequently, it is always necessary when making and evaluating curl tests to take into consideration curl influencing factors. For example, the physical flatness of a given photographic film element will depend to varying degrees upon its method of manufacture, its storage history (humidity, temperature, etc.) before exposure, and, when exposed, its method of processing after exposure, the method of drying employed, and its storage history after drying.

When a sample of material from a roll of exposed and processed film is tested, the additional factor of a "set" or curl resulting from the rolled form is introduced. The American National Standards Institute standard test procedure ANSI PH1.29-1971 assigns numerical curl values for samples of photographic films. Under said procedure, in ANSI Test Method A, a square or circular sheet of the material is measured; in ANSI test Method B, covering long rolls of film, the widthwise curl of a reasonably long length is measured; and in ANSI test Method C, a small narrow specimen is measured. These measurements may be considered to be quantitative in nature only to the extent that the numerous variables that may be introduced have been controlled and standardized prior to the test.

The ANSI standard test procedure provides methods primarily for determining quantitatively the departure from physical flatness of unprocessed photographic films in sheet, roll or strip forms prior to exposure and processing. The values obtained may be useful in indicating the relative performance of the materials in cameras, printers, etc. The ANSI standard test procedure is not intended for use in determining the curl characteristics of film during processing stages including drying. However, the methods given in the standard procedure may be applied to processed films, and may be useful to indicate their performance during handling and viewing, and in projectors, enlargers and the like, including microfiche readers.

The ANSI curl values are expressed in units of 100/R when R is the radius of curvature measured in inches, or units of 1/R, where R is expressed in centimeters (cm). (100/R in −1(R in inches) = 254 × 1/R cm−1 (R in centimeters)). This gives metric units which differ from the English units by a sufficiently large amount to permit differentiation, even if the units are not stated.

Curl may be described as being in the "machine direction" or in the "cross machine direction". Curl in the "machine direction" refers to the curvature about an axis perpendicular to the machine direction of coating, or direction of travel of film in a machine. Curl in the "cross machine direction" refers to curvature about an axis parallel to the machine direction of the coating.

In the ANSI method, when the material curls toward a more heavily coated surface, the curl measurement is reported as a positive value; and when the curl is toward the other surface of the element, which may be free of coating, the measurement is reported as a negative value. A positive value is assigned arbitrarily to one side of the film which is equally coated on both surfaces. When such designation of positive and negative curl is inconsistent with that described earlier with regard to a selected reference surface, designation based on a selected reference surface is preferably used as a matter of convenience.

In carrying out the ANSI test procedure, material samples intended for use in curl tests should exhibit no obvious physical defects, be representative of the whole of samples being tested, and be treated uniformly. Preferably, the materials being compared should have been subjected to the same history of events from the time of manufacture. Comparisons are conducted on a relative basis, and the results reported as "relative" curl. In the case of square or circular specimens, the machine direction should be indicated on each sample if known.

Samples of the materials to be tested are cut to one of the specified sizes according to the ANSI procedure under controlled conditions, and are then separated into groups which are each subjected to a different atmospheric condition for a prescribed time. Cotton or other suitable gloves should be worn by the operator while handling samples. Small specimens may be handled by means of tweezers, provided care is taken not to damage the specimens in any way. Moisture from hands or fingers will interfere with obtaining accurate test data. Care shall be taken so that the operator does not breathe on the specimens.

Samples are conditioned as discussed below, until practical moisture equilibrium (constant weight) has been reached. This may be determined by weighing samples at regular intervals of conditioning time, and determining the time at which further conditioning does not appreciably change the weight. In many instances this time will be in the vicinity of 4 hours at the testing temperature and humidity, but actual times will vary due to access of the conditioning air, and so on. Conditioning time should not exceed 24 hours even though small weight changes continue to be observed. At relative humidities of 70 percent and above, coated films sometimes undergo an irreversible change in curl with time. For this reason, the conditioning time should be standardized for comparison purposes. This is not made mandatory in the standard procedure because conditioning time also varies with the type of conditioning equipment. In conditioning sheet or roll film, the samples can be suspended freely by means of a hook or a rod through a hole in the center of one end near the edge, and separated enough to prevent contact with each other. Samples should be hung with the axis of curl vertical to avoid producing distortion. An alternative method of support for the conditioning of such samples is to place them horizontally on net-covered or screen-covered racks spaced so that there is free circulation of air.

A temperature of 21° C. (about 70° F.) and relative humidities of 15 percent, 50 percent, 70 percent, and 85 percent are suggested for carrying out the tests, but are not mandatory. Samples to be compared at several humidities are conditioned in the same order, and from low relative humidity to high relative humidity. For the purpose of teaching the present invention, a temperature of 21° C. (about 70° F.) and 50 percent relative humidity are used herein in carrying out the ANSI curl tests.

The test method used herein for measuring the amount of curl of microfiche film corresponds to Test Method A of the ANSI standard procedure, and is carried out in the following way. Briefly, at least three square specimens, or samples, measuring from 2" × 2" to 4" × 4" (5 × 5 cm to 10 × 10 cm) are prepared from each test piece of film to be tested.

A curl board template marked off with curves corresponding to various values of reciprocal radius is employed to measure the degree of curl of the specimens. FIG. 1 of the drawing corresponds to the series of curves of the curl board template of FIG. 1 of the ANSI standard procedure and may be referred to for a better understanding of the ANSI values discussed in regard to the test results described in the Examples and Tables herein.

The samples are conditioned to a constant weight condition as described above. At the end of the sample conditioning period and without removing the samples from the conditioned atmosphere, each of the test specimens is secured over the template by clamping one edge (the edge parallel to the axis about which the film curves) to a clamp as taught in the ANSI method. Alternatively, the film may be placed on edge over the template. Either way, the template is placed so that the axis of curl is vertical. The curl value of the curve most nearly coinciding with the curl of the film is noted and recorded as ANSI curl value.

In carrying out the ANSI standard test on thermoplastic film element to determine its original core-set curling tendency, i.e. before subjecting it to the heat-tempering process of this invention, two sets of flat test samples (preferably at least three samples per set) of the film element are prepared for testing. The first set of samples is conditioned to constant weight conditions at 70° F. (21° C.)/50% relative humidity according to the adapted ANSI Test Method A procedure described above, and its curl is measured and recorded. The average of the values is calculated and recorded as the "ANSI curl value of the original sample before shelf-life test", i.e. before the non-heat tempered original film has been wrapped on a core and subjected to a simulated shelf-life test.

The second set of samples of the film element is subjected to a simulated shelf-life test. Each of the samples is wrapped on a 3" o.d. core with any original curl compensated for by placing the convex surface next to the core perimeter. The samples are preconditioned at 70° F./50% R.H. for 24 hours. The samples then are stored for 24 hours at 120° F. (49° C.) at ambient relative humidity. Tests have shown that storage for 24 hours at 120° F. accelerates core-set and produces an amount of curl which is about equivalent to the amount of core-set curl produced during three months of storage of similarly wound samples at 70° F./50% R.H. The samples are then again conditioned to constant weight on the core at 70° F./50% R.H. for a period of at least 24 hours to not more than 72 hours. Each test sample is removed from its core, allowed to stand free for 60 seconds, and its ANSI curl value is then immediately measured. The curl values obtained are averaged. The average of the curl values so determined is designated as the "ANSI curl value of core-set original sample, after its shelf-life test", i.e. after the non-heat-tempered original film has been wrapped on a core and subjected to the simulated shelf-life test. The average of the ANSI curl values of the test samples of the second set of samples of the film element will usually be found to be greater than those of the test samples of the first set, due to the core-set curl induced into the film by its deformation around the 3" diameter core.

The differences between the average ANSI curl values of the two sets is calculated and is designated as the "shelf-life core-set curling tendency of original material". This value then is used as a standard ANSI curl value for comparing the reduction in shelf-life core-set curling tendency obtained when samples of the same film element are treated by the process of this invention and similarly tested for core-set curl values.

In the above tests and most of the following examples, a 3" diameter core is used in carrying out the core-set tests. However, the diameter of the core is not critical. In general, when the film is heat-tempered flat, the diameter of the core preferably will be about 3". When the film is heat-tempered in roll form, with or without core, equally reproducible results will be obtained if the test core is of smaller diameter than the of the roll of the core on which the film was heat-tempered. Generally, a test core having a diameter of from about 1" to 6" will be found adequate. In any case, both the non-heat-tempered and heat-tempered film samples should be wound on the same sized cores so that the results are consistent.

The above principles and the invention are illustrated by the following examples:

EXAMPLE 1

Heat-Tempering of Gel-Coated Polymeric Film in Sheet Form (a) Test (a): Determination of ANSI Curl Values of Heat-Tempered Film Before Shelf-Life Core-Set Test.

Individual samples from a first series of Sample Sets Nos. 1–24 of three samples each of 4" × 6" pieces of biaxially-oriented, heat-set, heat-relaxed poly(ethylene terephthalate) film (Tg = 104° C.) of 7 mil thickness from a test lot of film subbed on both surfaces with gelatine subbing composition and suitable for use as a photographic film support individually were heat-tempered according to the process of the invention in flat, single-layered sheet form at eight different temperatures ranging from 21° C. (69.8° F.) to 149° C. (300° F.) at 15% or less relative humidity for three different periods of time, i.e. 8, 24 and 168 hours, respectively, as shown in Table 1 under the column heading "Heat Tempering Conditions, 15% or less R.H.". The samples were all cooled and conditioned to constant humidity and weight in accordance with ANSI Method A test conditions at 70° F./50% R.H. for 24 hours. The ANSI curl value of each of the heat-tempered samples was measured. The value for each sample was found to be zero. These values were designated as "heat-tempered film, ANSI curl values before shelf-life test", i.e. before being wrapped on a core and being subjected to a simulated shelf-life test.

(b) Test (b): Determination of ANSI Curl Values of Heat-Tempered Film After Simulated Shelf-Life Core-Set Test The heat-tempered film samples from Test (a) were again preconditioned at 70° F./50% R.H. They then were each subjected to simulated shelf-life core-set conditions by wrapping them around 3" o.d. cores with their lengths lying in the machine direction. Each sample was heated for 24 hrs. at 120° F. (about 49° C.) to simulate a three month shelf-life storage period at ambient room temperature of 70° F. (about 21° C.)/50% R.H., during which time core-set occurred. The samples were then cooled and conditioned to ANSI Method A test conditions as discussed above. The curl of each sample was measured on an ANSI curl template and recorded in ANSI units. Average core-set curl values for each set were then calculated. The average core-set curl value for each set was designated as "heat-tempered film, ANSI curl value after simulated shelf-life test".

(c) Test (c): Determination of ANSI Curl Values of Original Film Before Simulated Storage Test The ANSI curl values of check sets of film samples, identified as Sample Sets Nos. 25 and 26, of non-heat-tempered poly(ethylene terephthalate) film from each test lot, and which had been conditioned at 70° F./50% R.H. for 24 hours, respectively, were determined. Each average ANSI curl value was determined and was designated as "original film, ANSI curl value before simulated shelf-life test" for its respective lot. The samples of this set were not heat-tempered, but were used in the following test (d).

(d) Test (d): Determination of ANSI Curl Values of Original Film After Simulated Shelf-Life Test Each film sample from Test (c) was wrapped on a 3" o.d. core. The samples then were subjected to the simulated shelf-life test and were core-set by heating them for 24 hours at 120° F. (about 49° C.) at ambient relative humidity, in the same manner as were the heat-tempered samples of the first series. Next, the samples were cooled, conditioned and tested for curl values in the same manner as were those in the first series. The average curl values were calculated and were designated "original film ANSI curl value after shelf-life test".

(e) Calculation of Shelf-Life Core-Set Curling Tendency of Original Film

The difference between the averages of the ANSI curl values of the set of film samples of Test (d) and of the ANSI curl values of the set of film samples of Test (c), which is the net core-set curl value was calculated and designated as "original film shelf-life core-set curling tendency". This is the "expected core-set curling tendency" as discussed earlier. (See Table 1, column A.)

(f) Calculation of Shelf-life Core-set Curling Tendency of Heat-Tempered Film

Net core-set curls (differences between the averages of the ANSI curl values of the heat-tempered film samples of Test (a) and the ANSI curl values of heat-tempered film samples of Test (b) of Sample Sets Nos. 1–24) were calculated and designated as "heat-tempered film shelf-life core-set curling tendency". This is the "obtained net core-set curling tendency" as discussed earlier. (See Table 1, column B.)

(g) Comparison of Simulated Shelf-Life Core-Set Curling Tendencies of Heat-Tempered Film vs. Original Material The average simulated shelf-life core-set curling tendency of each set of Sample Sets Nos. 1–24 of core-set heat-tempered film samples of Test (b) was compared individually with the average value for the original core-set curling tendencies of corresponding Sample Sets Nos. 25, 26 and 27, respectively, of Test (c). The results (in ANSI curl units) were designated "reduction in shelf-life core-set curling tendency". (See Table 1, column A-B=C.)

(h) Calculation of Simulated Shelf-Life Core-Set Curling Tendencies of Heat-Tempered Film as Percents of Those of Original Film The shelf-life core-set curling tendencies of the core-set heat-tempered film samples as determined in subparagraph (f) were then calculated as percentages of the shelf-life core-set curling tendencies of the original film as determined in subparagraph (e). (Each ANSI curl value in column B is divided by the corresponding ANSI curl value in Column A. The quotient is multiplied by 100.) The results were designated as core-set curling tendency of heat-tempered film as % of core-set curling tendency of original film. (See Table 1, column D.)

(i) Calculation of Reductions in Core-Set Curling Tendencies of Heat-Tempered Film as Percents of Original Core-Set Curling Tendencies The reductions in shelf-life core-set curling tendencies of the heat-tempered film samples as determined in subparagraph (g) were then calculated as percentages of the shelf-life core-set curling tendencies of the original film as determined in subparagraph (e). (Each ANSI curl value in column C is divided by the corresponding ANSI curl value in Column A. The quotient is multiplied by 100.) The results were designated as "reduction in core-set curling tendency of heat-tempered film as % of original core-set curling tendency". (See Table 1, column E.)

(j) Discussion of Table 1

The results of the tests and the calculations are shown in Table 1.

From Table 1, column D, Sample Set No. 4, it is seen that 8 hours of heat-tempering at 71° C. (160° F.) and 15% R.H. of the 4" × 6" samples of 7 mil poly(ethylene terephthalate) film element remarkably has altered the core-set curling tendency of the film, so that its tendency to take on core-set is only 46% of that of the core-set curling tendency of the original, non-heat-tempered poly(ethylene terephthalate) element. Referring to column E, Sample Set No. 4, it is seen that the core-set curling tendency of the film has been reduced by 54%.

Also, from Table 1, columns D and E, Sample Set No. 12, it is seen that 24 hours of heat-tempering at 15% R.H. of the same poly(ethylene terephthalate) element material causes inhibition in shelf-life core-set curl tendency to 34% of the original shelf-life core-set curl tendency, or a reduction in tendency by 66%. Further, from Table 1, cols. D and E Sample Set No. 20, it is seen that 168 hours of heat-tempering at 15% R.H. of the poly(ethylene terephthalate) causes an inhibition in shelf-life core-set curl tendency to 35% of the original shelf-life core-set curl tendency, or a reduction in tendency by 65%.

It is further seen from Table 1, columns D and E, Sample Set Nos. 3–5, 11–13 and 19–21, that heat-tempering of the heat-set, heat-relaxed, biaxially-oriented poly(ethylene terephthalate) film element for from 8 to 24 hours at a temperature of from about 60° to 82° C. (140° to 180° F.) inhibits core-set curling tendency to from 34 to 51% of that of the non-heat-tempered poly(ethylene terephthalate) film element, or stated otherwise, causes a reduction in core-set curling tendency by 49 to 66%. It also is to be noted that heat-tempering the film element for a period of 168 hours at the optimum temperatures of 71° C. did not result in any significant improvement in the core-set curling tendency over that for 24 hours at 71° C. at a particular temperature. (Compare Sample Set Nos. 12 and 20.)

Referring to Table 1, column B, Sample Set Nos. 3–5, 11–13 and 19–21, it is seen that the net core-set curl values for the core-set heat-tempered film are from 12 to 18 ANSI curl units as compared to 35 ANSI curl units for the core-set, original, non-heat-tempered film.

Determination of Operable Heat-Tempering Temperature Range and Optimum Heat-Tempering Temperature The data listed in Table 1 can be used to determine an operable heat-tempering temperature range and the optimum heat-tempering temperature for heat-tempering the poly(ethylene terephthalate) film in roll form in commercial quantities.

The percentages from Table 1, column D or column E, can be plotted on a chart as shown in FIG. 9 of the drawing for Tg = 104° C. A test piece of non-core-set heat-tempered film from a sample Set showing optimum reduction in core-set upon heat-tempering, for example, a piece from Sample Set No. 12, Test (a), may be used to make a DSC trace, e.g. as described in the Petrie article at 20° K./min. heating rate. The DSC trace is positioned at any convenient vertical position on the chart of the Table 1 data, but with the temperatures of the DSC trace aligned on the same temperature scale as that of the data. The vertical (ordinate) position of the DSC trace is not relevant to the percentage scale of the chart.

In FIG. 9, percentages from Table 1, column E, have been plotted and are shown connected by solid lines.

Also shown in FIG. 9 (dashed lines) are additional percentages for periods of from 0.25 to 8 hours of heat-tempering of a poly(ethylene terephthalate) having Tg = 99° C., determined at a heating rate of 20° K./min. From the solid lines in FIG. 9, it is noted that test samples which were heat-tempered for from 8 to 168 hours at different temperatures in the range from 21° C. up to about 71° C. acquired less core-set curling tendency as the temperature used to heat-temper the film was elevated. When the film samples were heat-tempered at temperatures above about 71° C. into the glass transition temperature range (Tg = 104° C.), the heat-tempered film experienced less inhibition of core-set curling tendency. This phenomenon is noted to occur regardless of whether the heat-tempering period was 8, 24 or 168 hours (one week). It is also to be noted that a heat-tempering period above 24 hours gave no appreciable improvement in percentage of core-set curling tendency reduction up to 168 hours of heating. However, heating for a longer period than 168 hours would provide further improvement in this respect.

It is further to be noted that a beneficial reduction in core-set curling tendency, i.e. a reduction of at least 30% is obtained over the temperature range from about 40° C. to about 100° C. Such a 30% reduction is considered to be the minimum acceptable improvement in curling tendency for most photographic applications. Therefore, the heat-tempering temperatures which will result in such a reduction in curl according to this invention are preferred for a beneficial heat-tempering temperature range. Also, it is determined that a reduction of core-set curling tendency to 50% of that of the original material is obtained by heat-tempering the element anywhere in the range from about 55° C. to 93° C., preferred as an optimum heat-tempering temperature range.

TABLE 1

EFFECT OF HEAT-TEMPERING TIMES AND TEMPERATURES ON SIMULATED SHELF-LIFE CORE-SET CURLING TENDENCIES OF 7 MIL GEL-COATED, HEAT-SET, HEAT-RELAXED, BIAXIALLY-ORIENTED POLY(ETHYLENE TEREPHTHALATE) (Tg = 104° C.) FILM RELATIVE TO TENDENCIES OF ORIGINAL FILM

| Core-Set Curling Tendency (absolute core-set curl) ANSI Curl Units, Core-Set 24 hours at 49° and R.H. of Original Film | Sample Set | Heat-Tempering Conditions 15% or less R.H. | | Core-Set Curling Tendency (net Core-set curl) ANSI Curl Units Con-Set 24 hrs. at 49° C./amb.R.H. of Heat-Tempered Film | Reduction In Core-Set Curling Tendency, ANSI Curl Units | Core-Set Curling Tendency of Heat-Tempered Film as % of Core-Set Curling Tendency of Original Film | Reduction in Core-Set Curling Tendency of Heat-Tempered Film as % of Original Core-Set Curling Tendency |
|---|---|---|---|---|---|---|---|
| Sample Set No. | A UNITS | # | Temp. °C | Time Hrs. | B UNITS | A-B = C UNITS | B/A × 100 = D % | C/A × 100 = E % |
| 25 | 35 | 1 | 21 | 8 | 35 | 0 | 100 | 0 |
|  | " | 2 | 38 | " | 32 | 3 | 91 | 9 |
|  | " | 3 | 60 | " | 18 | 17 | 51 | 49 |
|  | " | 4 | 71 | " | 16 | 19 | 46 | 54 |
|  | " | 5 | 82 | " | 18 | 17 | 51 | 49 |
|  | " | 6 | 100 | " | 24 | 11 | 69 | 31 |
|  | " | 7 | 116 | " | 30 | 5 | 77 | 23 |
|  | " | 8 | 149 | " | 30 | 5 | 86 | 14 |
| 26 | 35 | 9 | 21 | 24 | 35 | 0 | 100 | 0 |
|  | " | 10 | 38 | " | 32 | 3 | 91 | 9 |
|  | " | 11 | 60 | " | 15 | 20 | 43 | 57 |
|  | " | 12 | 71 | " | 12 | 23 | 34 | 66 |
|  | " | 13 | 82 | " | 15 | 20 | 43 | 57 |
|  | " | 14 | 100 | " | 24 | 11 | 69 | 31 |
|  | " | 15 | 116 | " | 27 | 8 | 77 | 23 |
|  | " | 16 | 149 | " | 30 | 5 | 86 | 14 |
| 27 | 34 | 17 | 21 | 168 | 34 | 0 | 100 | 0 |
|  | " | 18 | 38 | " | 26 | 8 | 76 | 24 |
|  | " | 19 | 60 | " | 14 | 20 | 41 | 59 |
|  | " | 20 | 71 | " | 12 | 22 | 35 | 65 |
|  | " | 21 | 82 | " | 14 | 20 | 41 | 59 |
|  | " | 22 | 100 | " | 23 | 11 | 68 | 32 |
|  | " | 23 | 116 | " | — | — | — | — |

TABLE 1-continued
EFFECT OF HEAT-TEMPERING TIMES AND TEMPERATURES ON SIMULATED SHELF-LIFE CORE-SET CURLING TENDENCIES OF 7 MIL GEL-COATED, HEAT-SET, HEAT-RELAXED, BIAXIALLY-ORIENTED POLY(ETHYLENE TEREPHTHALATE) (Tg = 104° C.) FILM RELATIVE TO TENDENCIES OF ORIGINAL FILM

| Core-Set Curling Tendency (absolute core-set curl) ANSI Curl Units, Core-Set 24 hours at 49° and R.H. of Original Film | Sample Set | Heat-Tempering Conditions 15% or less R.H. | Core-Set Curling Tendency (net Core-set curl) ANSI Curl Units Con-Set 24 hrs. at 49° C./amb.R.H. of Heat-Tempered Film | Reduction In Core-Set Curling Tendency, ANSI Curl Units | Core-Set Curling Tendency of Heat-Tempered Film as % of Core-Set Curling Tendency of Original Film | Reduction in Core-Set Curling Tendency of Heat-Tempered Film as % of Original Core-Set Curling Tendency |
|---|---|---|---|---|---|---|
| " | 24 | 149 " | 29 | 5 | 85 | 15 |

Further, it is to be noted that the optimum heat-tempering temperature of about 71° C. is 33 degrees Centigrade below the glass transition temperature (Tg) of 104° C. for the poly(ethylene terephthalate) film of the test lot used in Example 1. (Tg determined by the Petrie DSC method described above.) This optimum heat-tempering temperature is not predictable from the glass transition temperature and must be determined separately for each lot of stock material prior to carrying out a large scale heat-tempering treatment on the material.

Referring again to FIG. 9, attention is directed to the curves shown in dashed lines. These curves are based on percentages obtained in heat-tempering tests which were carried out at heat-tempering times of 0.25, 0.5, 1, 2, 4 and 8 hours respectively substantially following the procedures described in Example 1. The only significant variable, other than time, was the glass transition temperature of the film lot from which the samples were obtained. The glass transition temperature of the film lot was determined by the Petrie DSC trace to be Tg = 99° C. It is seen from FIG. 9 that the curves are skewed toward the right on the chart. Also, it is to be noted that the optimum heating temperature lies along a line which varies from about 71° C. for 8 hours of heat-tempering to about 82° C. at 0.25 hour of heat-tempering. For this lot of film, at least 30% reduction in core-set-curling tendency is induced into the film by heat-tempering at a selected temperature in the range from about 50° to 96° C. for the corresponding time period of from 0.25 to 8 hours. A comparison of the peak maximal of all the curves of FIG. 9 shows an increase in the heat-tempering time which permits the maximum amount of reduction in core-set curling tendency to be obtained at lower temperatures. On the other hand, an increase in temperature at which heat-tempering is carried out results in a decrease in the amount of reduction in core-set curling tendency, particularly when one does not carry out the process within the optimum heat-tempering temperature. The data used to prepare the curves charted in dashed lines in FIG. 9 for the film lot having Tg = 99° C. are shown in Table 2.

TABLE 2
Effect of Heat-Tempering Times and Temperatures on Shelf-Life Core-Set Curling Tendencies of 7 Mil Gel-Coated, Heat-Set, Heat-Relaxed, Biaxially-Oriented Poly(Ethylene Terephthalate) (Tg = 99° C.) Film Relative To Those Of Original Film

| Sample Set # | Heat-Tempering Conditions Temp., °C. | Time, Hrs. | Core-Set[1] Curling Tendency of Heat-Tempered Film, ANSI Curl Units | Reduction in Core-Set Curling Tendency of Heat-Tempered Film, ANSI Curl Units | Reduction in Core-Set Curling Tendency of Heat-Tempered Film as % of Original[2] Core-Set Curling Tendency |
|---|---|---|---|---|---|
| 1 | 38 | ¼ | 32 | 1 | 3 |
| 2 |  | ½ | 32 | 1 | 3 |
| 3 |  | 1 | 32 | 1 | 3 |
| 4 |  | 2 | 31 | 2 | 6 |
| 5 |  | 4 | 29 | 4 | 12 |
| 6 |  | 8 | 29 | 4 | 12 |
| 7 | 60 | ¼ | 32 | 1 | 3 |
| 8 |  | ½ | 32 | 1 | 3 |
| 9 |  | 1 | 28 | 5 | 15 |
| 10 |  | 2 | 26 | 7 | 21 |
| 11 |  | 4 | 22 | 11 | 33 |
| 12 |  | 8 | 18 | 15 | 45 |
| 13 | 71 | ¼ | 26 | 7 | 21 |
| 14 |  | ½ | 20 | 13 | 39 |
| 15 |  | 1 | 17 | 16 | 48 |
| 16 |  | 2 | 16 | 17 | 52 |
| 17 |  | 4 | 16 | 17 | 52 |
| 18 |  | 8 | 12 | 21 | 64 |
| 19 | 82 | ¼ | 20 | 13 | 39 |
| 20 |  | ½ | 18 | 15 | 45 |
| 21 |  | 1 | 16 | 17 | 52 |
| 22 |  | 2 | 15 | 18 | 55 |
| 23 |  | 4 | 15 | 18 | 55 |
| 24 |  | 8 | 14 | 19 | 58 |
| 25 | 100 | ¼ | 28 | 5 | 15 |
| 26 |  | ½ | 25 | 8 | 24 |
| 27 |  | 1 | 25 | 8 | 24 |
| 28 |  | 2 | 25 | 8 | 24 |
| 29 |  | 4 | 25 | 8 | 24 |
| 30 |  | 8 | 25 | 8 | 24 |
| 31 | 149 | ¼ | 31 | 2 | 6 |

TABLE 2-continued

Effect of Heat-Tempering Times and Temperatures on Shelf-Life Core-Set Curling Tendencies of 7 Mil Gel-Coated, Heat-Set, Heat-Relaxed, Biaxially-Oriented Poly(Ethylene Terephthalate) (Tg = 99° C.) Film Relative To Those Of Original Film

| Sample Set # | Heat-Tempering Conditions Temp., °C. | Time, Hrs. | Core-Set[1] Curling Tendency of Heat-Tempered Film, ANSI Curl Units | Reduction in Core-Set Curling Tendency of Heat-Tempered Film, ANSI Curl Units | Reduction in Core-Set Curling Tendency of Heat-Tempered Film as % of Original[2] Core-Set Curling Tendency |
|---|---|---|---|---|---|
| 32 | | ½ | 29 | 4 | 12 |
| 33 | | 1 | 28 | 5 | 15 |
| 34 | | 2 | 28 | 5 | 15 |
| 35 | | 4 | 28 | 5 | 15 |
| 36 | | 8 | 28 | 5 | 15 |

[1] Core-set tests carried out on 3" o.d. cores for 24 hours at 49° C./ambient R.H. (net core-set curl)
[2] Core-set curling tendency of original film was 33 ANSI curl units.

Referring once more to Table 1, column B, it is seen that controlled heat-tempering according to this invention not only results in the reduction of core-set curling tendency, but it also provides a method for making a film element which has a predictable, controlled amount of curl. For example, referring to the data in column B for Sample Set Nos. 9-16, it is seen that when heat-tempering was carried out for 24 hours, the actual amount of shelf-life core-set curl induced by heating at the different temperatures dropped from 32 ANSI curl units at 38° C. (Set No. 10) to 12 ANSI units at 71° C. (Set No. 12) and then increased again to 24 ANSI units at 100° C., (Set No. 14).

The method is especially advantageous for the manufacture of film elements which meet a predetermined standard for curl for a particular thickness of film. In the case of processed microfiche made from 7 mil thick, subbed, poly(ethylene terephthalate) film, the ultimate amount of curl present preferably should not exceed about ±9 ANSI curl units at 50% relative humidity. Since reverse winding of a coated film tends to reduce the amount of curl ultimately developed in roll film, a heat-tempered stock microfilm material having a predictable shelf-life core-set of no more than about 12 ANSI units (Sample Set No. 12) would be suitable for reverse-wound coated film used for microfiche. The manufacture of 7 mil poly(ethylene terephthalate) consistently having such a low amount of curl is made possible by the present method. Also, if it is desired to prepare from the same lot of 7 mil film a heat-tempered film having 20 ANSI curl units, the film can readily be made by use of the appropriate temperature for heat-tempering to such curl value.

For example, to make a heat-tempered film (Tg = 104° C.) which predictably would core-set to no more than 20 ANSI curl units, using as starting material a non-heat-tempered film stock having a core-set curling tendency of 35 ANSI curl units, one would need to obtain a reduction of 15 curl units, or 43% in core-set curling tendency. Referring to FIG. 9, it is seen that a 43% reduction in core-set curling tendency can be obtained by heat-tempering the film for from 0.5 to 168 hours at an appropriate temperature in the range from about 48° to 92° C. The optimum time would be 0.5 hour at 82° C.

Heat-Tempering of Film in Roll Form

Another embodiment of the invention will now be described. This embodiment is directed to heat-tempering of self-supporting film in roll form. Film for use in the photographic arts is made commercially in millions of square feet per year at thousands of linear feet per minute. It is clear that the method of this invention, if applied simply to treatment of single sheets, or thicknesses, of self-supporting film would be inefficient for large scale manufacturing purposes. A commercially practical embodiment of the invention, therefore, is necessary to obtain the maximum benefits and advantages of the invention. Such an embodiment is provided by heat-tempering of self-supporting thermoplastic core-set prone film, coated or non-coated, as herein described. The heat-tempering of stock rolls of film eliminates the need to drape sheets of film on a multiplicity of racks in a heat-tempering oven, wherein the number of racks and the amount of oven space required would be prohibitive. Furthermore, whereas such sheets would be susceptible to contamination by dust and light and to wrinkling, tearing, distortion and a wide variety of other potentially harmful events, the film unwound from a heat-tempered roll of film stock material is found to be smooth, free of blocking, distorting, knurling or other defects.

It has now been found that self-supporting film can be subjected to the temperature and humidity heat-tempering conditions described herein in roll form, even when thousands of linear feet of the film, in widths up to about 60", are wrapped on a core of from 6" to about 10" o.d. to form a stock roll of polymeric film element having an outside diameter of up to about 36" o.d., or more. The overall time for heat-tempering of the roll of film was found necessarily to be longer, because of the lag time required to bring the rolled material to heat-tempering temperatures. However, once such temperatures were reached, the heat-tempering was found to proceed rapidly, and the advantages and benefits of the invention were found to be obtained even as they are with the small flat sheets of test samples. Such treatment is illustrated by Example 2.

EXAMPLE 2

Heat-Tempering of Self-Supporting, Subbing Coated Film In Roll Form

A 12" wide, 24" o.d. stock roll of a continuous strip of 7 mil poly(ethylene terephthalate) (Tg (est.) 104° C.) photographic film support, wound on a 10" o.d. core and having a gelatin subbing on each surface, was subjected to heat-tempering. The roll was placed in a tempering oven provided with forced hot air circulation means. The heat-tempering conditions which were used were based on information provided from tests on test samples carried out as described in Example 1. The roll of film was heated for 168 hours (one week) at an oven temperature of 71° C. (160° F.) to reduce core-set curl tendency by heat-tempering according to the invention. The heat-tempered film element was found, upon cooling and unwinding from the stock roll, to have an excellent appearance, free from mottles, distortions, core impressions or knurling marks or collapses. The tendency for the support to add core-set curl when subsequently rewound on a small diameter (3") core was visibly dramatically reduced by the heat-tempering.

EXAMPLE 3

Heat-Tempering of Roll Form of Self-Supported, Subbing Coated Film With Measurements of Core-Set Curling Tendency After Subsequent Coating With Silver Halide Emulsion and other Coating Layers and Simulated Shelf-Life Core-Setting A 12" wide, 24" o.d., roll of the same kind of continuous strip of 7 mil thick, self-supported, gelatin subbing coated poly(ethylene terephthalate) (Tg (est.) 104° C.) photographic film support as was used in Example 2, wound on a 6" o.d. core, was treated as described in Example 2. The roll was heat-tempered in the same tempering oven for 168 hours (one week). The oven was heated at a constant oven temperature of about 185° F. (85° C.). No attempt was made to control the ambient relative humidity which was low at the elevated temperature. A substantially constant roll heat-tempering temperature estimated to be somewhat greater than 160° F. (71° C.), as measured by thermocouples, was obtained. At the end of the week, the roll of heat-tempered film support was cooled to room temperature under ambient conditions of temperature and humidity. The roll of heat-tempered support, illustrated by FIG. 8, having a film cross-section substantially as shown in FIG. 4, subsequently was coated with layers of silver halide emulsion and other known coating layers to make a roll of non-processed (i.e. non-exposed) photographic film element. The emulsion layer was applied to the convex surface of the heat-tempered support. The film had a cross-section substantially like that shown in FIG. 5, and was suitable for use as radiation sensitive microfilm stock material.

A roll of otherwise identical, but non-heat-tempered, poly(ethylene terephthalate) photographic film support was similarly coated with the same emulsion and other coating layers to make a similar non-processed radiation sensitive film element.

The coated supports from the rolls were rewound onto separate 3" o.d. cores with the convex, emulsion-coated surfaces of the supports facing the core. The rolls of materials were preconditioned at 21° C./50% R.H. They were then held in the tempering oven for 24 hours at 120° F. to simulate three months (about 2200 hours) of shelf-life storage under core-set conditions. The core-set film from each roll was then rewound onto other 3" o.d. cores with the emulsion side facing the core.

Samples were taken from the core end of each rewound film element (i.e. the end now at the start of each roll, due to the rewinding.) Sets of samples from each roll (Test Group Nos. 1-4) were conditioned under different relative humidities, of 15%, 35%, 50% and 70%, and the ANSI curl values of the samples measured and averaged, and compared with ANSI curl values of sets of samples from corresponding, not core-set films. The results of the tests are shown in Table 3 and charted in FIGS. 2, 3 and 3A of the drawing.

TABLE 3

COMPARISON OF ANSI CURL VALUES AND CORE-SET CURLING TENDENCIES BETWEEN NON HEAT-TEMPERED AND HEAT TEMPERED POLY(ETHYLENETEREPHTHALATE) FILM SUPPORTS AFTER EMULSION COATING

| Test Group No. | % R.H. | Curl Values in ANSI Units Before Simulated Storage Test** Support: Not Heat-Tempered After Emulsion Coating A | Curl Values in ANSI Units Before Simulated Storage Test** Support: Heat-Tempered* After Emulsion Coating D | Test Group No. | % R.H. | Curl Values in ANSI Units After Simulated Storage Test** Support: Not Heat-Tempered After Emulsion Coating B | Curl Values in ANSI Units After Simulated Storage Test** Support: Heated-Tempered* After Emulsion Coating E | CSCT*** in ANSI Curl Units B-A = C | CSCT*** in ANSI Curl Units E-D = F | Reduction in CSCT in ANSI Curl Units C-F = G | Reduction in CSCT in Percent G/C×100=H |
|---|---|---|---|---|---|---|---|---|---|---|---|
| 1 | 15 | 13 | 5 | 5 | 15 | 30 | 10 | 17 | 5 | 12 | 70 |
| 2 | 35 | 5 | −4 | 6 | 35 | 25 | −1 | 20 | 3 | 17 | 85 |
| 3 | 50 | 0 | −11 | 7 | 50 | 18 | −7 | 18 | 4 | 14 | 78 |
| 4 | 70 | 0 | −12 | 8 | 70 | 17 | −6 | 17 | 6 | 11 | 65 |

*Heat-tempered 168 hours at 85° C. at ambient RH.
**Simulated shelf-life test conditions: 24 hours at 49° C.(120° F.)/amb. R.H.
***CSCT = Core-Set Curling Tendency in adjusted units.

In Table 3, the emulsion coated surface is designated as the reference surface for both films. Accordingly, positive curl values indicate curl toward the emulsion coated surface, and negative curl values indicate curl toward the other surface. The selection and designations of the reference surfaces and the directions of curls are in accordance with the discussion above.

From the data shown in Table 3, it is seen that after core-setting during the simulated shelf-life tests, the photographic film element having the heat-tempered, subbing coated film support has undergone significantly lesser amounts of changes in core-set curl values and in core-set curling tendencies at different levels of relative humidity than the photographic film having the original or non-heat-tempered, subbing coated film support. The differences in curl values between the heat-tempered and non-heat-tempered film elements are evident also in FIGS. 2 and 3, where the dashed lines represent the respective values for the core-set photographic film elements and the solid lines represent respective values for non-core-set photographic film elements. Also, it is seen that the core-set curl values of core-set photographic film element in absolute ANSI curl units at all levels of relative humidity varied only between 3 and 6 units from those of non-core-set photographic film elements in the case of the photographic film elements having heat-tempered coated film supports (Table 3, column F), as compared to from 17 to 20 absolute ANSI curl units for the photographic film elements having non-heat-tempered coated original film supports (Table 3, column C). These results are charted in FIG. 3A. It is seen, further, that at each level of relative humidity the actual curl value of the core-set heat-tempered photographic film element having a coated film support (column E) is well within, or close to, an acceptable curl value of about ± 9 ANSI curl units for 7 mil microfiche film.

Figure 2:
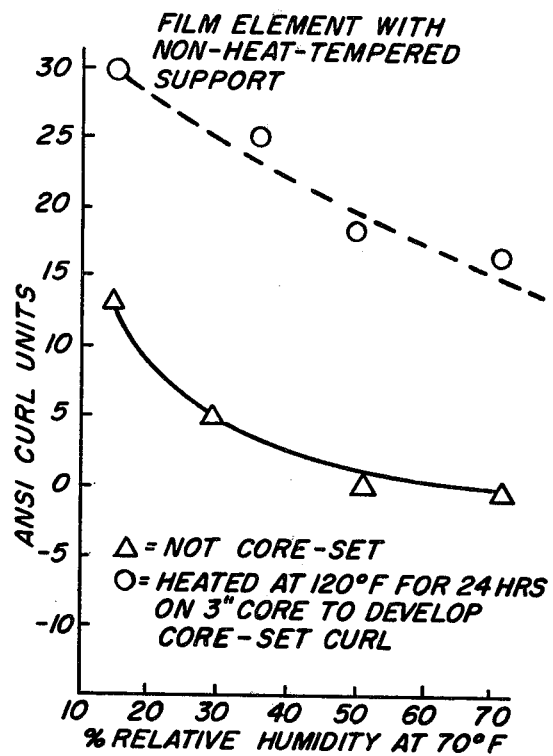
FIG. 2 is a chart showing a series of comparisons of ANSI curl unit values of photographic film elements having original (non-heat-tempered) poly(ethylene terephthalate) film supports at various levels of relative humidity before and after core-setting of the elements in accordance with a prescribed core-setting and measuring procedure.

FIG. 2 illustrates the dependence of the ANSI curl units on the relative humidity (R.H.) at 70° F. of two poly(ethylene terephthalate) (PET) supports coated with a photographic emulsion layer. The data represented by the solid line of FIG. 2 demonstrated that such a photographic film that has not been subjected to winding on a core shows no curl in a relative humidity range between 50% and 70% and is flat; however, the photographic film tends to curl in the direction of the emulsion layer ("positive curl"), when one reduces the relative humidity of the ambient atmosphere, due to contraction of the gelatine in the layer.

The broken line of FIG. 2 relates to a PET support coated with a photographic emulsion layer which, rolled up on a 3" outer diameter core with the emulsion layer facing the core, was kept at a temperature of 49° C. for 24 hours (simulated 3 months storage test). The broken line of FIG. 2 illustrates that the curling tendency of the photographic film is greatly increased by the simulated 3 month storage test.

Figure 3:
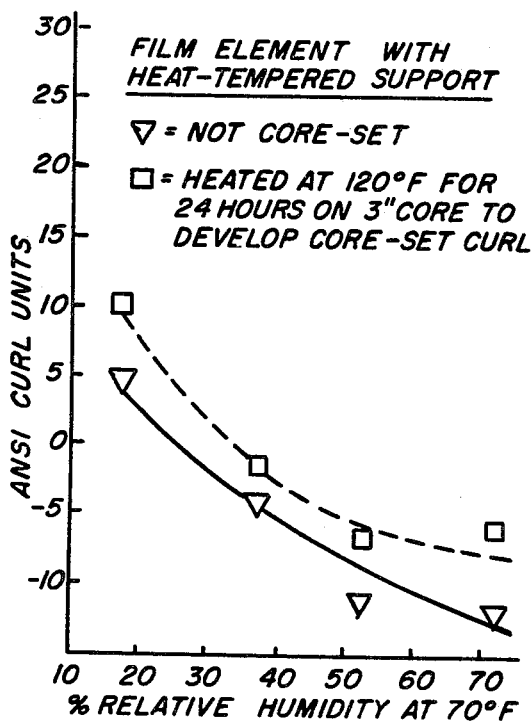
FIG. 3 is a chart showing a series of comparisons of ANSI curl unit values of photographic film elements having heat-tempered poly(ethylene terephthalate) film supports at various levels of relative humidity before and after core-setting of the elements in accordance with a prescribed core-setting and measuring procedure.

FIG. 3 illustrates the dependence of ANSI curl units on the relative humidity (R.H.) at 70° F. of two heat-tempered PET supports which were coated after heat-tempering with the same photographic emulsion layer.

The solid line of FIG. 3 shows that the emulsion-coated photographic film exhibits a moderately negative curl at high relative humidity and that this curling tendency of the photographic film reverses to slightly positive values with decreasing relative humidity of the ambient atmosphere.

The data of the broken line of FIG. 3 were obtained when the heat-tempered and emulsion-coated photographic film was rewound on a 3" o.d. core, emulsion side facing inward, and subjected to the simulated 3-month storage test, 24 hours at 49° C. in a rolled-up condition. The results illustrated by the broken line show that (a) the photographic film exhibits only a slight curling tendency over a relatively wide range of relative humidity (70%–25% R.H.), and that (b) the core-setting of the heat-tempered, emulsion coated photographic film, under the condition of the simulated 3 month storage test, has only a slight influence on its curling tendency.

Figure 3A:
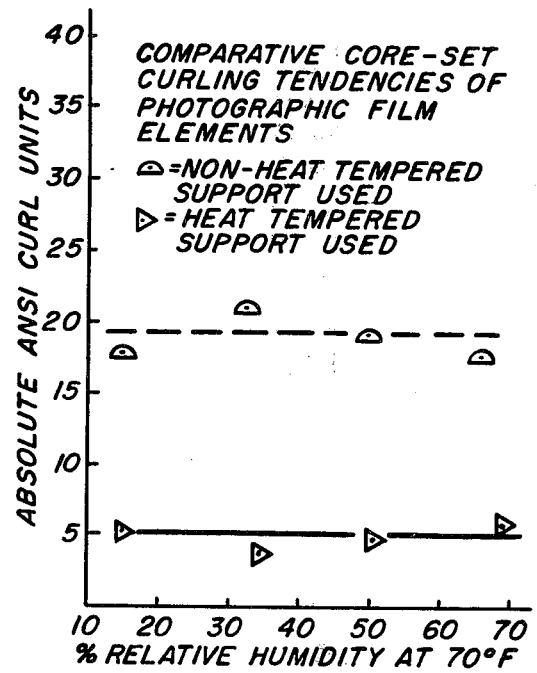
FIG. 3A is a chart showing a comparison of a series of net core-set curls at various levels of relative humidity of the photographic films charted in FIGS. 2 and 3.

A comparison between FIGS. 2 and 3 further shows that the actual curl values of core-set film in ANSI curl units at all levels of relative humidity vary only between 3 and 6 units from those of non core-set film in the case of the heat-tempered coated films (Table 3, column F), as compared to from 17 to 20 ANSI curl units for the non-heat-tempered original film (Table 3, Column C). It is seen, further, that at each level of relative humidity the core-set curl value of the core-set, heat-tempered, coated film element (column E) is well within an acceptable curl value of about ± 9 ANSI curl units for 7 mil microfiche film or close to ± 9 ANSI curl units at very high values of relative humidity. FIG. 3A demonstrates a) that the amount of curl induced in the film by storage (core-setting) is approximately constant for various levels of relative humidity, and b) that the level of curl induced in the film is reduced drastically (to approximately ¼ of the untreated film) by the heat-tempering step of the invention.

EFFECTS OF ACTUAL SHELF-LIFE CORE-SETTING ON CURL VALUES

The comparative effects of actual, rather than simulated, shelf-life core-setting on core-set curl values and core-set curling tendencies of a heat-tempered versus a non-heat-tempered silver halide emulsion coated poly(ethylene terephthalate) photographic film element are shown by the following example.

EXAMPLE 4

Comparison of Actual Shelf-Life ANSI Curl Values of Core-Set Silver Halide Emulsion Coated Photographic Film Element Having Heat-Tempered Poly(ethylene terephthalate) Support Versus Similar Element Having Non-Heat-Tempered Poly(ethylene terephthalate) Support A 7 mil thick, 12" wide, continuous strip of self-supported, poly(ethylene terephthalate) (Tg (est.) 104° C.) film support having a photographic subbing layer coated contiguous to one surface was wound subbed side facing out on a 10" o.d. core to form an 18" o.d. stock roll of the support. The roll was placed in a tempering oven and heated at a constant temperature of about 82° C. (180° F.) for 168 hours to heat-temper the poly(ethylene terephthalate) support. The roll of heat-tempered support was cooled at ambient room temperature and humidity conditions to about 21° C. The heat-tempered subbed support was then coated with a silver halide emulsion and other conventional layers used to make a roll of radiation sensitive film element useful for making microfilm and having a film structure substantially as that shown in FIG. 5. Original (non-heat-tempered) support material from the same lot of poly(ethylene terephthalate) support and having a subbing layer contiguous to one surface was identically coated with silver halide emulsion and other layers of coating materials used in the photographic arts to make a similar, but non-heat-tempered, photographic film element.

The photographic film elements were each wound to 6" o.d. on separate 3" o.d. cores with the emulsion-coated surfaces of the elements chosen as the reference surface as in Example 3 and facing in. The wound film elements on the cores were conditioned at 21° C./50% R.H. Samples were cut from the exterior layers of the rolls and tested for ANSI curl values at 15%, 35%, 50% and 70% relative humidity, respectively. Each roll of photographic film stock material was then stored at 21° C./50% R.H. for 4 months. Samples were again taken and tested again for ANSI curl values, at the same relative humidities. The rolls of photographic film were then stored at 21° C./50% R.H. for an additional 4 months, making a total of 8 months of storage. ANSI curl values of samples from each roll were again determined, as before.

In carrying out the ANSI curl value measurements, samples in each test sequence were removed from the storage roll and conditioned for two hours at 15% R.H. before making the first measurement. Each sample was then conditioned for two hours prior to each subsequent measurement, at each of the other test condition relative humidities, e.g. 35%, 50% and 70% R.H.

The data from the various tests are shown in Table 4. ANSI curl values listed are the average values determined from the test sets. Positive curl values indicate curl toward the silver halide emulsion-coated surface, and negative curl values indicate curl away from that surface.

The data in column E show that the core-set curl values of the core-set, heat-tempered coated film ele-

TABLE 4

Comparison of ANSI Curl Values and Core-Set Curling Tendencies of Photographic Film Element Having Heat-Tempered Film Support VS. Photographic Film Element Having Non-Heat-Tempered Film Support Before and After Actual Shelf-Life Tests

| | | Before Storage | | | | | After Storage | | | | | |
|---|---|---|---|---|---|---|---|---|---|---|---|---|
| | | Support Not Heat-Tempered Before Coating | Support Heat-Tempered Before Coating (2) | | | | Support Not Heat-Tempered Before Coating | | Support Heat-Tempered Before Coating(2) | | Reduction in CSCT in ANSI | % Reduction In CSCT |
| | | ANSI Curl Units After Coating | ANSI Curl Units After Coating | | | | ANSI Curl Units After Coating | | ANSI Curl Units After Coating | | | |
| Test Group No. | R.H. | (1) A | (1) D | Test Group No. | R.H. | Time | CURL B | CSCT(3) B−A=C | CURL E | CSCT(3) E−D=F | Curl Units C−F=G | G/C×100= H |
| 1 | 15 | 13 | 5 | 9 | 15 | 4 Months | 24 | 11 | 12 | 7 | 4 | 36 |
| 2 | 35 | 5 | −4 | 10 | 35 | | 20 | 15 | 5 | 9 | 6 | 40 |
| 3 | 50 | 0 | −11 | 11 | 50 | | 15 | 15 | −2 | 9 | 6 | 40 |
| 4 | 70 | 0 | −12 | 12 | 70 | | 12 | 12 | −6 | 6 | 6 | 50 |
| 5 | 15 | 13 | 5 | 13 | 15 | 8 Months | 32 | 19 | 14 | 8 | 11 | 58 |
| 6 | 35 | 5 | −4 | 14 | 35 | | 23 | 18 | 6 | 10 | 8 | 44 |
| 7 | 50 | 0 | −11 | 15 | 50 | | 20 | 20 | 0 | 11 | 9 | 45 |
| 8 | 70 | 0 | −12 | 16 | 70 | | 15 | 15 | −6 | 6 | 9 | 60 |

(1) 7 mil Poly(ethylene terephthalate) (Tg(est) 104° C.). Coated with silver halide emulsion and other coating layers.
(2) Heat-tempered 168 hours at 71° C. at ambient RH.
(3) CSCT = Core-Set Curling Tendency.

The data in Table 4 shows that the radiation sensitive film element with the heat-tempered support, in general, has developed much less core-set curl and has experienced significant beneficial reduction in core-set curling tendency compared to the element with the non-heat-tempered support. For example, samples in Test Group No. 11, conditioned at 50% relative humidity prior to testing, show that at the end of 4 months the element with the heat-tempered support had a curl value of −2 (col. E) compared to a curl value of 15 (col. C) for the comparable element with non-heat-tempered support. Also, at 8 months, in Test Group No. 15, the element with the heat-tempered support had a curl value of 0 (col. E) compared to 20 (col. C) for the comparable element with the non-heat-tempered support. Calculations of the reductions in core-set curling tendencies (CSCT) of the coated film element having the heat-tempered support as a percentage of the CSCT of the coated element with the non-heat-tempered support (using the calculation method described in Example 1), shows that the CSCT of the element with the heat-tempered support had been reduced to 40% of the CSCT of the element with the non-heat-tempered support at the end of 4 months, and to 45% at the end of 8 months.

Further, it is seen that the curl of the element with the heat-tempered support has gone from a negative curl value of −11 (Test Group No. 3, col. D) to a curl value of −2 (Test Group No. 11, col. E) ANSI units, or a core-set curling tendency of 9 (Test Group No. 11, col. F). Thus, while the shelf-life core-set curling tendency of the element with the coated heat-tempered support has been reduced to only 40% of the shelf-life curling tendency of the coated non-heat-tempered support, the heat-tempered support-containing element actually became flatter during the shelf-life storage on a 3" core; meanwhile, the element with the coated non-heat-tempered support acquired more core-set curl toward the emulsion coated surface (Test Group Nos. 3 and 11 and Nos. 7 and 15.)

ments at relative humidities of 35 to 70% are such that the films are acceptable for manufacture of microfiche having a low curl value.

EXAMPLE 5

Comparison of ANSI Curl Values of Core-Set, Processed Microfilm Element Having Heat-Tempered Poly(ethylene terephthalate) Support Kept on Core Versus Similar Element Having Non-Heat-Tempered Poly(ethylene terephthalate) Support. Both Kept on Cores for One Month A 7 mil thick, 12" wide, continuous strip of poly(ethylene terephthalate) (Tg (est.) 104° C.) photographic film support having a gelatin-containing subbing layer coated contiguous to one surface thereof was wound on a 10" o.d. core, with the subbing layer surface (also referred to herein as a "subbed surface") outermost, to form a 24" o.d. stock roll of support. The roll was placed in a tempering oven at ambient room temperature. It was heated gradually to heat-tempering temperature of about 82° C. (180° F.) and heat-tempered at that temperature for 4 days (96 hours). The heat-tempered roll of support was cooled gradually to room temperature at ambient room temperature and humidity conditions. The support was then coated on the subbed surface with a silver halide emulsion and other layers to form a radiation sensitive photographic film element suitable for making microfilm product. The photographic film element then was slit into 4" wide strips. The emulsion coated surface was chosen as the reference surface, as in Example 3. Each strip was wound onto a 3" o.d. core with the emulsion-coated surface innermost. The resulting stock rolls of photographic film elements were packaged and stored for one month under ambient indoor temperature and humidity conditions.

The film element from each roll was exposed and then processed in film-processing plant equipment. The processed film was cut into microfiche sized film cards (substantially as shown in FIGS. 6 and 7) measuring about 4" × 6". Test Groups of samples were taken from each roll for measurement of curl values.

The ANSI curl values of sets of the Test Group samples then were determined. The ANSI curl values of sets of Test Group samples of standard processed microfiche having a non-heat-tempered poly(ethylene terephthalate) photographic film support were also determined. Measurements of curl values for both kinds of samples were made at 21° C. at four different conditions of relative humidity, namely, 15%, 35%, 50% and 70%, using substantially the same testing procedures as described in Example 3.

The data from the test results are shown in Table 5, columns A and B. Curl values listed are average values determined for each set of Test Group samples.

Table 5 shows that processed microfiche made with the heat-tempered support (column B) has less actual curl (closer to zero value) than does the processed microfiche made with the non-heat-tempered support (column A). Also, the amount of actual curl for the element with the heat-tempered support (column B, 2 to −8 ANSI curl units) is within the ± 9 ANSI curl unit limit found most acceptable for microfiche.

In the preceding tests, the microfilm element on the stock roll had been wound with the subbing layer on the outermost surface. After being coated with photographic emulsion over the subbing layer, the element with the heat-tempered support was kept rolled with the emulsion-coated surface innermost during storage and exposure of the film. After processing, the film was cut into microfiche.

Measured curl obtained with the element having the non-heat-tempered support is positive, at all of the relative humidity conditions, and indicates that the curl is toward the emulsion coated surface regardless of the presence of moisture.

On the other hand, measured curl of the element with the heat-tempered support is seen to be positive only at a 15% relative humidity. At higher relative humidities, the effect of moisture on emulsion coating is seen to cause the element to curl away from the emulsion coated surface. This is indicative that the core-set curling tendency of the element with the heat-tempered support is considerably less than that of the element with a non-heat-tempered support.

Calculations of the changes in measured curl values of microfiche elements having heat-tempered supports, in absolute units, from those of the microfiche elements having the non-heat-tempered supports at relative humidities of 15%, 35%, 50% and 70% show that overall changes of 16, 22, 21, 21 ANSI curl units, respectively, are obtained, (Table 5, column C).

Considered from the aspect of processed film element flatness, measured curl values of the processed microfiche elements having heat-tempered supports are reduced by 16, 8, 5 and 5 ANSI curl units, respectively, from those of the corresponding elements having the non-heat-tempered supports, at the corresponding relative humidities, as shown in column D of Table 5.

These beneficial results confirm the advantages of heat-tempering the film supports used to make microfiche elements, to reduce measured curl in the rolled processed microfiche stock material during actual storage on a roll.

TABLE 5

Comparative Actual Shelf-Life ANSI Curl Values of Heat-Tempered vs. Non-Heat-Tempered Processed Microfiche Film Elements Having Poly(ethylene terephthalate) Supports

| Relative Humidity at Time of Curl Measurement | Support Not Heat-Tempered Before Emulsion Coated Curl Value, ANSI Curl Units, After Shelf-Life* Test on 3" o.d. Core at 21° C./50% RH A | Support Heat-Tempered Before Emulsion Coated B | Change in Measured Curl Value ANSI Curl Units Change A-B=C | Reduction D |
|---|---|---|---|---|
| 15% | 18 | 2 | 16 | 16 |
| 35% | 15 | −7 | 22 | 8 |
| 50% | 13 | −8 | 21 | 5 |
| 70% | 13 | −8 | 21 | 5 |

*Shelf-Life Time = One Month

EXAMPLE 6

Heat-Tempering of Polyester Film Element Having Hydrophilic Coatings on Both Surfaces A continuous strip of 2.5 mil thick, biaxially-oriented, heat-set, heat-relaxed poly(ethylene terephthalate) (Tg (est.)104° C.) film element was coated on both surfaces with adhesion-promoting layers which then were overcoated with hydrophilic gelatin subbing layers. The undercoating layers were copolymeric latices, of which the principle compound is vinylidene chloride, as described, for example, in U.S. Pat. No. 3,143,421. The subbing layers were of the type known as "unmodified gel sub", such as also described, for example, in U.S. Pat. No. 3,143,421.

The subbed poly(ethylene terephthalate) film element was cut to provide test samples of about 4" × 6" in size. The samples were divided into two sets of three samples each. The ANSI curl values for each set of samples were determined and were found to average zero (indicating absence of any curl) for each set. Each sample in the sets was then placed flat between glass plates and held for 24 hours at 15% or less relative humidity. The samples of one set were held at 21° C. (70° F.). The samples of the second set were heat-tempered at 71° C. (160° F.). The curl values of the samples from both sets were measured and again found to be zero ANSI units.

Each sample was then wrapped around a 1¼" o.d. core rather than a 3" core, in order to simulate a roll of movie film. Each sample then was heated for 24 hours at 49° C. (120° F.) to simulate core-set conditions of three months of shelf-life storage under ambient storeroom conditions. The core-set curl values of the samples which had been held at 21° C. were found to average 72 ANSI curl units. The core-set curl values of the samples which had been heat-tempered at 71° C. were found to average only 20 ANSI curl units. Upon calculation of the core-set curling tendencies as done in Example 1, it is found that the core-set curling tendency (CSCT) of the subbed poly(ethylene terephthalate) film element which had been heat-tempered at 71° C. was found to be only 28% of the CSCT of the similar film element which had been held at 21° C. This is a reduction of 72% in core-set curling tendency due to heat-tempering of the subbed support.

EXAMPLE 7

Heat-Tempering of Non-Coated Polyester Film Element in Sheet Form (8.5 mil Thick)

A continuous strip of 8.5 mil thick, biaxially-oriented, heat-set, heat-relaxed poly(ethylene terephthalate) (I.V. = 0.62) film element free of coated layers was cut into 4" × 6" pieces. The ANSI curl values of two sets of samples of the pieces were determined and found to be zero. Each sample in the sets was then placed flat, i.e. in sheet form, between glass plates. One set of samples was heat-tempered in an oven for 24 hours at relative humidity of 15% or less at 82° C. (180° F.). The other set of samples was held at 21° C. (70° F.). The curl values of the samples from each set then again were measured and were again found to average zero ANSI units. No attempt was made to determine the optimum heat-tempering temperature for this lot.

Each sample was then wrapped around a 3" o.d. core and heated for 24 hours at 49° C. (120° F.) to simulate core-set conditions of three months of shelf-life storage under ambient storage conditions. The core-set curl values of the samples which had been held at 21° C. were found to average 32 ANSI curl units. The core-set curl values of the samples which had been heat-tempered at 82° C. were found to average 16 ANSI curl units. The core-set curling tendency (CSCT) of the samples of non-coated poly(ethylene terephthalate) film element which had been heat-tempered at 82° C. was calculated as in Example 1 and was found to be only 50% of the CSCT of the similar film element which had been held at only 21° C. This is a reduction of 50% in core-set curling tendency, due to heat-tempering of the 8.5 mil thick poly(ethylene terephthalate) film.

EXAMPLE 8

Heat-Tempering of Silver Halide Emulsion-Coated Polyester Based Photographic Film Element in Sheet Form A continuous strip of non-heat-tempered 7 mil thick subbed poly(ethylene terephthalate) (Tg (est.) 104° C.) support film element from stock material prepared substantially as described in Example 3 was coated with a photographic silver halide emulsion of the type used in black and white photography and with other conventional layers to prepare a radiation sensitive photographic film element. Samples of the latter element were cut to form two sets of test pieces of about 4" × 6" in size.

Test pieces measured for curl values averaged 2 ANSI curl units at 50% R.H. prior to any treatment. One set of samples was heat-tempered by placing the samples in sheet form, between flat glass plates and heating them for 24 hours at 71° C. (160° F.) at ambient relative humidity. Curl values of test pieces from this set of samples averaged 3 ANSI curl units at 50% R.H. Samples from each set of samples were then wrapped individually, contrary to the prescribed procedure discussed earlier, with the emulsion surface facing inward, on 3" o.d. cores and subjected to a simulated shelf-life storage conditions at 49° C. (120° F.) for 24 hours (equivalent to three months under ambient storage conditions). In view of the low amount of curl, the results obtained are found consistent with those obtained when the convex surface faces the core. The average ANSI curl values of each set of samples was then determined at relative humidities of 15%, 35%, 50% and 70%, respectively, using substantially the same procedure as described in Example 4. The results are shown in Table 6. Curl values listed are average values determined for each set of samples.

Table 6 shows that heat-tempered non-processed silver halide photographic film element has a lower shelf-life, or core-set, ANSI curl value than does a similar non-heat-tempered film element at all levels of relative humidity. Comparison of the core-set curl values shows that the curl of a heat-tempered film element at 50% relative humidity, compared to the curl of the non-heat-tempered film element at 50% R.H. is reduced by 57%. This example shows that even non-processed radiation sensitive film element having a polyester support can be heat-tempered to provide acceptable microfiche stock material.

TABLE 6

Comparative Simulated Shelf-Life ANSI Curl Values of Heat-Tempered VS. Non-Heat Tempered Core-Set, Non-Processed Silver Halide Emulsion Photographic Film Elements Having Polyester Support

| Relative Humidity at Time of Curl Measurement | Element Not-Heat-Tempered Before Shelf-Life Test | Element Heat-Tempered Before Shelf-Life Test | Reduction in Core-Set Curl Value, ANSI Curl Units |
|---|---|---|---|
| | Curl Value, ANSI Curl Units, After Simulated Shelf-Life Test on 3" o.d. core at 49° C. for 24 hours | | |
| 15% | 34 | 23 | 11 |
| 35% | 26 | 18 | 8 |
| 50% | 23 | 12 | 11 |
| 70% | 18 | 10 | 8 |

EXAMPLE 9

Heat-Tempering of Diazo Film Element Having Polyester Support

A continuous strip of 7 mil thick, biaxially-oriented, heat-set, heat-relaxed poly(ethylene terephthalate) (Tg (est.)104° C.) film element was coated with diazo coating composition to form a diazo photographic film element suitable for use in the diazo process for reproducing images by an image transfer process. The diazo process is based on the formation of a dye as a result of the reaction of a light-exposed diazo compound with its decomposition product or a coupling component, substantially as described in Yutzy et al U.S. Pat. Nos. 2,596,756, issued May 13, 1952 and 2,716,059 issued Aug. 23, 1953. Diazo film elements are generally more sensitive to heat than are silver halide emulsion coated photographic film elements. Accordingly, lower heat-tempering temperatures must be used for heat-tempering diazo film elements than are acceptable with silver halide emulsion coated film elements.

The diazo coated film element was cut into 4" × 6" samples. Average ANSI curl values of two sets of samples were determined and were each found to be zero. Each sample in the two sets was then placed flat between glass plates. The samples of one set were held for three weeks at 21° C. (70° F.). The samples of the second set were heat-tempered for three weeks at 43° C. (109° F.). The curl values of the samples from each set again were measured and again were found to average zero ANSI units.

Each sample was then wrapped around a 6" o.d. core and heated for 24 hours at 49° C. (120° F.) to simulate core-set conditions of three months of shelf-life storage under ambient storeroom conditions. The core-set curl values of the samples which had been held at 21° C. were found to average 12 ANSI curl units. The core-set curl values of the samples which had been heat-tempered at 43° C. were found to average 6 ANSI curl units. Calculation of the average core-set curling tendency (CSCT), as done in Example 1, of the set of samples of diazo coated poly(ethylene terephthalate) film element which had been heat-tempered at 43° C. shows its CSCT to be only 50% of the CSCT of the film element which had been held at only 21° C. The reduction in core-set curling tendency also was found to be 50%. This example shows that non-processed diazo composition coated film element having a polyester support can be heat-tempered to provide a film product having less core-set curl and less core-set curling tendency than does similar non-heat-tempered diazo film element.

EXAMPLE 10

Heat-Tempering of Other Thermoplastic Polymeric Film Elements

The beneficial and advantageous results obtained by heat-tempering of poly(ethylene terephthalate) film elements are also obtained when the heat-tempering process is carried out on film elements comprising other thermoplastic film-forming polymers, for example, other polyesters, polycarbonates, and cellulose ester films. The results obtained in heat-tempering film elements of four such other polymeric films will now be illustrated.

The specific exemplary polymers of which film elements were heat-tempered are poly(1,4-cyclohexylene dimethylene terephthalate) (4 mil film), poly(ethylene-2,6-naphthalene dicarboxylate) (3 mil film), poly((2,2-bis(4-hydroxyphenyl) propane carbonate)) (4 mil film), and cellulose triacetate, i.e. cellulose acetate containing from 42.5 to 44.0 percent acetyl, (4 mil film). The first two of these polymeric films were semi-crystalline in that each film was biaxially-oriented, heat-set and heat-relaxed film. The latter two polymeric films were of amorphous structure.

Heat-tempering of each polymeric film was carried out at specific temperatures, ranging from 21° C. to 180° C., for 24 hour periods, at 15% or less relative humidity.

In each heat-tempering treatment, 7 Test Group sets of samples were placed flat between glass plates and then heat-tempered according to the above conditions. Each set consisted of three 4" × 6" pieces of a particular polymeric film. ANSI curl value of each sample was measured, and average curl values after heat-tempering for each set were calculated.

Each heat-tempered sample then was wrapped around a 3" o.d. core and subjected to a simulated shelf-life test at 49° C. (120° F.) for 24 hours (approximately equivalent to three months of storage at ambient conditions). The ANSI curl value of each core-set, heat-tempered sample was measured and averages for each set were calculated. The difference in average ANSI curl values of the two sets, i.e., before and after core-setting, was then calculated and designated as core-set curling tendencies (CSCT) of heat-tempered film.

Simulated shelf-life core-set curling tendencies of comparative sets of non-heat-tempered samples of the same polymeric films similarly were determined. The reductions in ANSI curl units of simulated shelf-life core-set curling tendencies (CSCT) of the heat-tempered samples over those of the corresponding CSCT of the non-heat-tempered samples were then calculated; the results are shown in Table 7, columns A, B, C and D. The reductions in CSCT values in ANSI curl units of the respective simulated shelf-life tested, heat-tempered samples as percentages of the corresponding CSCT of the non-heat-tempered samples were then calculated for the various heat-tempering temperatures; the results are shown in Table 7, columns A', B', C', D'.

Additionally, the glass transition temperatures, Tg, of each of the polymers listed in Table 7 was determined by means of a Petrie DSC trace, using a heating rate of 20° K./min. as described herein. The Tg values were found to be as follows:

| Polymer | Tg |
|---|---|
| Poly(1,4-cyclohexylene dimethylene terephthalate) | 109° C. |
| Poly(ethylene-2,6-naphthalene dicarboxylate) | 198° C. |
| Poly((2,2-bis(4-hydroxyphenyl)-propane carbonate)) | 148° C. |
| Cellulose Triacetate | 193° C. |

Referring to Table 7, columns A and A', it is seen from both the curl values in column A and the percentages in column A' that heat-tempering of poly(1,4-cyclohexylene dimethylene terephthalate) can be advantageously carried out at 100° C., e.g. at about 9° C. below the glass transition temperature, Tg, of 109° C. (228° F.) for this polymer, thereby to obtain at least 32% reduction in the core-set curling tendency of the film and low curl. It is to be noted that when the optimum heat-tempering temperature is around 60° C., a 69% reduction in CSCT is obtained.

In the case of poly(ethylene-2,6-naphthalene dicarboxylate), it similarly is seen from Table 7, columns B and B', that heat-tempering of this polymer can be carried out advantageously at a temperature ranging from about 60° C. to about 149° C. (300° F.), preferably between 71° C. (160° F.) and 120° C. (248° F.), and most preferably at about 100° C. (212° F.). These preferred temperatures all are well under the glass transition temperature, Tg, of 198° C. of this polymer, as determined by a Petrie DSC trace of the heat-tempered polymer.

Likewise, from Table 7, columns C and C', it is seen that heat-tempering of poly((2,2-bis(4-hydroxyphenyl)-propane carbonate)) can be carried out advantageously at temperatures in the range from about 60° C. to about 120° C., most preferably at about 120° C. (240° F.). These temperatures are all under the glass transition temperature (Tg) of 148° C. of this polymer, as determined by a DSC trace of heat-tempered polymer. Also, it is to be noted that the extruded poly((2,2-bis-4-hydroxyphenyl)-propane carbonate)) is an amorphous material. Nevertheless, its appropriate heat-tempering temperature range can be determined, as shown, for practice of this invention.

Lastly, it is seen from Table 7, columns D and D', that heat-tempering of another amorphous polymeric film, cellulose acetate, can be carried out advantageously at temperatures of about 71° C. in order to obtain at least a 30% reduction in core-set curling tendency. This temperature is well under the glass transition temperature, Tg, of 193° C. of this polymer, as determined by a DSC trace of heat-tempered polymer.

From the low curl values obtained for heat-tempered poly(1,4-cyclohexylene dimethylene terephthalate) and for poly[2,2-bis(4-hydroxy-phenyl)-propane carbonate] it is seen that these heat-tempered films are suitable for making films having an acceptable ANSI curl value of about ±9 ANSI units.

Although the reductions in core-set curling tendencies of the poly(ethylene-2,6-naphthalene dicarboxylate) and the cellulose acetate films in non-coated forms do not make them appear to be acceptable for manufacture of microfiche, the significant reductions in their core-set curling tendencies improves such films for use in manufacture of photographic roll films, such as cinematographic films, having less clock-springing, or unwinding, tendency when the film is in reverse-wound processed form. Of course, poly(ethylene terephthalate), poly(1,4-cyclohexylene dimethylene terephthalate) and poly((2,2-bis(4-hydroxyphenyl)-propane carbonate)) also are improved for this purpose by the heat-tempering process of this invention.

pered film which has been similarly kept. All measurements of curl values are made in conformance with American Material Standard Methods for Determining the Curl of Photographic Film, Method ANSI PH1.29-1971, wherein the ANSI curl unit values are expressed as 100/R, and where R is the radius of curvature of the film in inches (as previously discussed herein).

In general, it has been found that heat-tempered film will attain a net core-set curl value which, at most, is about 85% of the net core-set curl which non-heat-tempered film will attain under the same core-setting conditions on a 3" o.d. core. Usually, the net core-set curl value of heat-tempered film will be from about 35 to 70% that of non-heat-tempered film, and in some cases may be even less, e.g. 22% as shown in Table 8, column E hereof. When non-heat-tempered film is subjected to core-setting under the above conditions, the net core-set curl value of the film can be readily determined in accordance with suitable prescribed procedures, as described, for example, herein in connection with Example 1. The net core-set curl value so determined is referred to in Table 8, column A, as a "100%", or "actual" value, and is used for the purpose of comparison with the "actual" net core-set curl value determined for

TABLE 7

Effect of Heat-Tempering 24 Hours at Various Temperatures on Amounts of Core-Set Curling Reduction and Reductions in % of Original Core-Set Curling Tendencies Obtained for Specific Thermoplastic Polymeric Film Elements

| Test Group Set No. | Heat Tempering Temperatures, °C. | Polymer | ANSI Curl Value Units Reduction in Core-Set Curling Tendency | | | | Reduction in Core-Set Curling Tendency of Heat-Tempered Film as % of Original Core-Set Curling Tendency | | | |
|---|---|---|---|---|---|---|---|---|---|---|
| | | | A | B | C | D | A' | B' | C' | D' |
| 1 | 21 | | 16 | 30 | 16 | 32 | 0 | 0 | 0 | 0 |
| 2 | 60 | | 5 | 18 | 8 | 26 | 69 | 36 | 50 | 19 |
| 3 | 71 | | 6 | 16 | 8 | 22 | 62 | 44 | 50 | 31 |
| 4 | 100 | | 11 | 13 | 8 | 23 | 32 | 57 | 50 | 28 |
| 5 | 120 | | 15 | 16 | 4 | 24 | 7 | 44 | 75 | 25 |
| 6 | 149 | | 17 | 20 | 16 | 24 | 0 | 33 | 0 | 25 |
| 7 | 180 | | | 25 | | 30 | | 17 | | 6 |

A,A' = Poly(1,4-cyclohexylene dimethylene terephthalate) Tg = 109° C. (Petrie DSC trace)
B,B' = Poly(ethylene-2,6-naphthalene dicarboxylate) Tg = 198° C. (Petrie DSC trace)
C,C' = Poly[2,2-bis(4-hydroxyphenyl)-propane carbonate] Tg = 148° C. (Petrie DSC trace)
D,D' = Cellulose triacetate containing from 42.5% to 44.0% acetyl Tg = 193° C. (Petrie DSC trace)

Characterization of Heat-Tempered, Self-Supporting Thermoplastic Polymeric Article of Manufacture The heat-tempered, self-supporting thermoplastic polymeric film resulting from the practice of the process of this invention is a novel article of manufacture. It differs from previously known polymeric films in that it is characterized by its low core-set curl at the end of a defined core-setting time in comparison with otherwise identical non-heat-tempered, self-supporting thermoplastic polymeric film.

The novel article of this invention can be defined in terms of the relationship of (a) the net core-set curl, determined in ANSI curl unit values, acquired by the heat-tempered self-supporting thermoplastic polymeric film during keeping on a test core over a fixed period of time, i.e. 2200 hours (3 months) of actual shelf-life at 70° F. (21° C.)/50% R.H., or preferably, for 24 hours of keeping at 120° F. (40° C.) and a relative humidity (R.H.) up to 50% on a 3" o.d. test core, (which simulates the above three month keeping period) to (b) the net core-set curl which is attained by non-heat-tempered film. The net core-set curl value of the non-heat-tempered film is also used to determine "calculated net core-set curl values" at 85% and 70% levels of core-set. A net core-set curl value, or level, of 85% corresponds to the net core-set curl value one should expect to obtain in a heat-tempered film in which the core-set curling tendency has been reduced by 15% from that of non-heat-tempered film. Similarly, a net core-set curl value at a 70% level corresponds to the expected value at a 30% reduction in core-set curling tendency. The net core-set curl is determined from measured ANSI curl value by subtracting from the measured ANSI curl value of a film any amount of curl present in the film before core-setting the film. Such correction for the existence of any curl in the pre-core-set film is made in measurements for both non-heat-tempered and heat-tempered films.

In Table 8 is shown a comparison of net core-set curl values of non-heat-tempered (column A) and heat-tempered (column D) films from various of the examples. In column C, the corresponding 70% level (calculated) net core-set curl values

TABLE 8

Comparative Net Core-Set Curl Values of Heat-Tempered vs. Non-Heat Tempered Films

| Data From Example No. | Polymeric Film Element | Non-Heat-Tempered Film ANSI Curl Value at Indicated % of Net Core-Set Curl | | | Heat-Tempered Film | |
|---|---|---|---|---|---|---|
| | | 100% (Actual) A | 85% (Calc.) B | 70% (Calc.) C | Net Core-Set Curl Value at Opt. Heat-Tempering Conditions D Units | Net Core-Set Curl Value as % of Net-Core Set Curl Value of Non-Heat-Tempered Film D/A × 100 = B % |
| 1 (Sample Sets Nos. 12, 14) | Poly(ethylene terephthalate), gel-coated | 35 | 29.7 | 24.5 | 12 | 34.4% |
| 3 (Table 3, Test Group No. 3) | Poly(ethylene terephthalate), coated with emulsion | 18 | 15.3 | 12.6 | 4 | 22.0% |
| 4 (Table 4, Test Group 3) | Poly(ethylene terephthalate), subbed support | 15 | 12.7 | 10.5 | 9 | 60.0% |
| 6 | Poly(ethylene terephthalate), subbed* | 72 | 61.2 | 50.4 | 20 | 27.8% |
| 9 | Poly(ethylene terephthalate), diazo coated | 12 | 10.2 | 8.4 | 6 | 50.0% |
| 10 (Table 7, col. A) | Poly(1,4-cyclohexylene dimethylene terephthalate), non-coated | 16 | 13.6 | 11.2 | 5 | 31.0% |
| 10 Table 7, col. B) | Poly(ethylene-2,6-naphthalene dicarboxylate), non-coated | 30 | 25.5 | 21.0 | 13 | 43.5% |
| 10 Table 7, col. C) | Poly((2,2-bis(4-hydroxy-phenyl)-propane carbonate)), non-coated | 16 | 13.6 | 11.2 | 4 | 25.0% |
| 10 Table 7, col. D) | Cellulose Triacetate | 32 | 27.2 | 22.4 | 22 | 69.0% |

*core-set on 1 1/2" o.d. core, all others core-set on 3" o.d. core for non-heat-tempered film are listed. The significance of the values of heat-tempered film listed in column D can be better appreciated by calculating the values as precentages of the corresponding 100% actual values for non-heat-tempered film. The percentages so calculated are listed in column E.

Referring to the data in Table 8, column D, it is seen that the actual net core-set curl value for film which has been heat-tempered under optimum heat-tempering conditions for the respective film, is, in each instance, many curl units less than the 100%, 85% and 70% levels for the corresponding non-heat-tempered film. Referring to column D in conjunction with columns E and A, it is seen that the values in column D, correspond to net core-set curl levels in column E which range from as low as 22% to at most 69% of those of the corresponding non-heat-tempered films in column A.

It is thus seen that whether compared directly with the net core-set curl values of non-heat-tempered film, or as a percentage of net core-set curl value of non-heat-tempered film, the net core-set curl values of heat-tempered film are significantly distinctive over those of non-heat-tempered films. However, since the invention is directed to reduction of core-set curling tendency, it is preferred to define the article in terms of change in the number of ANSI curl units. For example, the novel article of this invention may be defined as a heat-tempered, self-supporting thermoplastic polymer film having reduced core-set curling tendency characterized in that the change in ANSI curl units that said film undergoes upon being maintained in rolled condition for 2200 hours at a temperature of 21° C. and R.H. up to 50% is at least 15% less than the change in the number of ANSI curl units that corresponding non-heat-tempered film undergoes upon core-setting under like conditions.

The above definition of the novel aritlce depends, it is seen, on the availability of the change in ANSI units, i.e. the net core-set curl value, in ANSI curl units of a non-heat-tempered film, and is useful both for distinguishing heat-tempered film from non-heat-tempered film, and for differentiating the films on the degree of the difference in net core-set values. However, in some cases, a sample of non-heat-tempered film may not be available for determining the 100% actual net core-set curl value of non-heat-tempered film, which is necessary for a standard of comparison. Therefore, it is desirable that, in the absence of such sample, some reliable means be available to aid in determining whether or not a particular film is, or is not, a heat-tempered film. Such a means may be provided from a record of the net core-set curl values of the particular films, based on accumulated data determined as described above.

Usually, it may be expected that the chemical and structural features of such a particular film will be known or can be determined, such as, its polymeric type, kinds of coating layers present on the film, and the like. From past determinations of net core-set curl values of similar films, it will be known what range of increases of net core-set curl values to expect to be induced into a heat-tempered film by core-setting, as compared to values expected to be obtained with a corresponding non-heat-tempered film. Then by referring to the known range of expected differences in induced net core-set curl values, it will be apparent from the induced net core-set curl value determined for the particular film whether or not the film is or is not a heat-tempered film. For example, from the data listed in Table 8, column D, it is seen that for heat-tempered polyester and polycarbonate films which were core-set on a 3" o.d. core for 24 hours at 49° C. at relative humidities of 50% R.H. or less (Examples 1, 3, 10, Table 7, columns A, B, and C), the induced increases in net core-set curl values obtained are each less than 14 ANSI curl units. Respectively, the values are 12, 4, 5, 13 and 4. In contrast, the expected induced increases in net core-set curl of the corresponding non-heat-tempered films (column A) are, respectively, 35, 18, 16, 30 and 16. The wide differences in induced increases in net core-set curl values between the respective heat-tempered films and their corresponding non-heat-tempered films (respectively, 23, 25, 14, 17 and 12 ANSI curl units) permits one skilled in the art of testing films to determine with a high degree of accuracy, from the magnitude of an induced increase in core-set curl value in ANSI units, whether or not the film has been heat-tempered prior to being core-set.

In view of the above distinctiveness in induced increase in core-set curl values, the novel film article of this invention can also be defined as an article comprising a heat-tempered, self-supporting polyester or polycarbonate film having reduced core-set curling tendency characterized in that the change in ANSI curl units that said film undergoes upon being maintained in rolled condition for 2200 hours at a temperature of 21° C. and relative humdity (R.H.) up to 50%, is no more than 14 ANSI curl units, at 50% R.H.

The above definition with its numerical limit of 14 ANSi units is especially directed to polyesters and polycarbonates which either are non-coated, or are coated with at least one subbing layer, and, preferably, with at least one radiation sensitive layer on at least one side of the film. For other self-supporting thermoplastic polymer films, numerical limits in ANSI curl units in net core-set curl values can be determined and used similarly to define a particular heat-tempered film. Thus, for cellulose triacetate (Example 10, Table 7, column D) a numerical limit for the amount of induced increase in net core-set curl which the heat-tempered film may be expected to attain is 22 ANSI curl units.

It is to be noted that the values of 14 ANSI curl units for polyesters and polycarbonates and of 22 ANSI curl units for cellulose triacetate are numerical limits for particular polymers which have been heat-tempered under optimum heat-tempering conditions in order to obtain a maximum reduction in core-set curling tendency. Since the process of the invention is expected usually to be used to obtain a maximum reduction in core-set curling tendency, the above values may be expected to be the usual net core-set curl values to be found for heat-tempered polyester, polycarbonate and cellulose triacetate films. However, it should not be overlooked that the ANSI curl unit value will be higher for an induced increase of net core-set curl for a film which has been heat-tempered to reduce the core-set curling tendency to as little as 15% of the original value and actually will be about that of the 85% level calculated value for a particular film.

The above principle can, nevertheless, be used, in many cases, to distinguish the heat-tempered film from non-heat-tempered film. Referring to Table 8, columns A and B and the data from Example 1, it is seen that a film which has been heat-tempered to obtain a poly(ethylene terephthalate) film product which will have a core-set curl at the 85% level will attain an induced increase in the net core-set curl value of 29.6 ANSI curl units (column B). It will thus be distinguishable from a non-heat-tempered film which under the same conditions would have a predictable net core-set curl value of 35 (column A).

The article of the invention, then, is a heat-tempered, self-supporting thermoplastic polymer film having reduced core-set curling tendency characterized in that the change in ANSI curl units that said film undergoes upon being maintained in a rolled condition for 2200 hours at a temperature of 21° C. and R.H. up to 50%, is at least 15% less than the change in the number of ANSI curl units that corresponding non-heat-tempered film undergoes upon core-setting under like conditions, and preferably is no more than 14 ANSI curl units.

In a preferred embodiment, the novel heat-tempered, self-supporting thermoplastic polymer film of this invention can be used to make a film product by a preferred integrated process comprising extruding the polymer to form a film, biaxially - orienting the film, heat-setting the film, heat-relaxing the film, cooling the film, coating a subbing layer contiguous to at least one surface of the film, winding the film into a roll on a supporting core with the subbing layer coated surface outermost, heat-tempering the roll of film according to the present invention, coating said coated surface of the heat-tempered film with radiation sensitive coating materials to form a multi-layered film, winding said multi-layered film with said coated surface innermost, slitting the film to desired widths, spooling the film, and using the spooled radiation sensitive films for manufacture of specific processed end products, e.g. microfiche, cinematographic films, and other similar film sheets or articles.

The present invention is especially advantageous for use in manufacture of low-core-set-curl-prone film from which images, particularly microimages, are projectable or readable, by transmission of light radiation. The expression "projectable or readable" is used herein to refer to any film for producing images when light radiation is directed therethrough or reflected therefrom; particularly, it is intended to include elements with image patterns consisting of silver, dyes, minute bubbles, and other image forming materials in a light transmissive medium. In one embodiment, the film comprises a silver halide emulsion coated on a dyed transparent linear polyester support. The emulsion is developable by conventional methods.

Any of the support materials used in the photographic arts can be used in the practice of this invention. Such support materials are typically polymeric, and include, for example, polyester film, polycarbonate film, cellulose acetate film, and related films, e.g. polystyrene film, which are useful in this art and which have a glass transition temperature above normal ambient atmospheric temperature. Usually, the film will be one having a glass transition temperature (Tg) whose endothermic peak as determined by means of a differential scanning calorimeter (DSC) at a heating rate of 20°K./min. is above about 60° C.

Suitable polyester film for use in this invention can be prepared from solid, linear, high-molecular weight polyesters derived by condensing a dihydric alcohol with a dibasic saturated fatty carboxylic acid or derivatives thereof. Suitable dihydric alcohols for use in preparing polyesters are well-known in the art and include any glycol wherein the hydroxyl groups are on the terminal carbon atom and contain from 2 to 12 carbon atoms, such as, for example, ethylene glycol, propylene glycol, trimethylene glycol, hexamethylene glycol, decamethylene glycol, dodecamethylene glycol, and 1,4-cyclohexane dimethanol. Dibasic acids that can be employed in preparing polyesters are well known in the art and include those dibasic acids containing from 2 to 16 carbon atoms. Specific examples of suitable dibasic acids include adipic acid, sebacic acid, isophthalic acid, and terephthalate acid. The alkyl esters of the above-enumerated acids can also be employed satisfactorily. Other suitable dihydric alcohols and dibasic acids that can be employed in preparing polyesters from which sheeting can be prepared are described in J. W. Wellman, U.S. Pat. No. 2,720,903, issued Oct. 11, 1955.

Specific examples of solid linear polyester resins which, in the form of sheeting or film, can be used in this invention are poly(ethylene terephthalate), poly(cyclohexane-1,4-di-methylene terephthalate), and poly(ethylene naphthalene dicarboxylate).

The thickness of the polyester sheet material employed in carrying out this invention is subject to variation. Polyester sheeting of a thickness of from about 2 mils to 50 mils can be advantageously heat-tempered according to this invention. Usually, for photographic film products, the thickness of the polyester sheeting used will be of the order of from about 2 to 10 mils.

Polyesters, particularly poly(ethylene terephthalate) are very hydrophobic. Therefore, as is known in the art, the polyester sheeting used for making photographic film elements which can be heat-tempered according to this invention are usually treated to make them hydrophilic and then are generally provided with an intermediate anchoring layer on at least one surface prior to the application to such surface of other conventional layers, for example, a light sensitive layer, or an anti-curl layer, as taught in U.S. Pat. No. 3,350,301. An intermediate anchoring layer is variously referred to in the art as an undercoating layer, a subbing layer, a sublayer, a substrate layer, or simply a "sub". A preferred polyester resin photographic film support having such a layer may be the subbed poly(ethylene terephthalate) which is described by Alles in U.S. Pat. Nos. 2,627,088 and 2,779,684. A preferred embodiment of this invention comprises heat-tempering such a subbed polymeric film.

Resins and resin compositions for use in providing such intermediate anchoring layers, or sublayers, on a surface of polyester film are well known in the art and may be present on the film either before or after heat-tempering of the film without adversely affecting the practice of the invention. A suitable resin for subbing purposes is a terpolymer of the type taught in the Alles patents and comprised of, by weight, from about 35 percent to 96 percent of vinylidene chloride, from about 3.5 percent to 64.5 percent of an ethylenically unsaturated ester (also referred to as an acrylic ester), and from about 0.5 to 25 percent of itaconic acid or the half methyl ester of itaconic acid, acrylic acid, or methacrylic acid. The ethylenically unsaturated esters can be acrylonitrile, methacrylonitrile, vinyl chloride, and alkyl esters of acrylic and methacrylic acids having 1 to 18 carbon atoms in the alkyl group such as methyl acrylate, ethyl acrylate, butyl acrylate, methyl methacrylate, ethyl methacrylate and butyl methacrylate. A terpolymer of the above type that can be used satisfactorily in carrying out this invention is a terpolymer of methyl acrylate, vinylidene chloride and itaconic acid. A specific example of such terpolymer is one comprised of, by weight, about 15 percent of methyl acrylate, about 83 percent of vinylidene chloride, and 2 percent of itaconic acid.

To establish and maintain adequate and satisfactory adhesion of the sublayer to a surface of the polyester film to which it is applied, an adhesion promoter can be included in the subbing prior to application of the subbing layer to a surface of the polyester film. The subbing resins as above described are usually applied from a water dispersion (often referred to as a latex). The amount of adhesion promoter employed should be from about 0.1 percent to 5 percent by weight based on the weight of the subbing resin. Water is employed as a vehicle or carrier for the copolymer and the adhesion promoter when applied to the polyester film material. The water is subsequently removed from the applied coating by drying.

Examples of suitable adhesion promoters for this purpose include resorcinol, orcinol, catechol, pyrogallol, 1-naphthol, 2,4-dinitrophenol, 2,4,6-trinitrophenonol, 4-chlororesorcinol, 2,4-dihydroxytoluene, 1,3-naphthalenediol, 1,6-naphthalenediol, acrylic acid, the sodium salt of 1-naphthol-4-sulfonic acid, benzyl alcohol, trichloroacetic acid, dichloroacetic acid, o-hydroxybenzotrifluoride, m-hydroxy-benzotrifluoride, o-fluorophenol, m-fluorophenol, n-fluorophenol, chloral hydrate, and o-creosol. Mixtures of two or more adhesion promoters can be employed, if desired.

To the subbed surface of the polyester film material there can be applied a matte coating composition. The "matte" portion of the matte layer can be any of a number of particulate conventional materials, ranging in particle size from about 1 to about 10 microns, that retain their particulate structure on the surface of the film product, the particulate layer (held in place by a hydrophobic resin binding agent) resulting in the desired, rough "matte"-type surface. Typical, nonlimiting examples of suitable "matte" materials include inorganic abrasive materials like silica, glass, quartz, diatomaceous earth, and calcium carbonate as well as organic resinous materials like the polyamide and interpolyamide resins described in U.S. Pat. No. 3,227,576.

Methods of preparing subbed, matte-surfaced polyester film are detailed in U.S. Pat. No. 3,227,576 and 3,589,905.

Suitable films for use as a support in this invention can also be prepared from cellulose esters, e.g. cellulose triacetate, containing from 42.5 to 44.0 percent acetyl. Such cellulose triacetate esters are described in U.S. Pat. Nos. 2,492,977, 2,492,978 and 2,739,069. However, a mixed cellulose ester, such as the cellulose acetate propionate described in U.S. Pat. No. 2,739,070, also may be used.

Photographic film elements which comprise a heat-tempered support made according to this invention can otherwise be of conventional structure. They can be exposed, processed, and stored in conventional ways while still retaining the low core-set curling tendency provided to the support by the process of this invention. The photographic film element will preferably comprise a radiation sensitive layer directly adhered to a heat-tempered support surface or to a subbing layer on a heat-tempered hydrophobic support material. The radiation sensitive layer will preferably be a silver halide emulsion layer.

Emulsions containing various types of silver salts can be used to form the silver halide layers, such as silver bromide, silver iodide, silver chloride or mixed silver halides such as silver chlorobromide, silver bromoiodide or silver chloroiodide. Typical silver halide emulsions are taught in patents listed in *Product Licensing Index*, Vol. 92, December 1971, publication 9232, at page 107.

The silver halide emulsions used in combination with the heat-tempered support of this invention can also contain other photographic compounds such as those taught in *Product Licensing Index*, op. cit., pages 107–110. The photographic compounds include development modifiers that function as speed increasing compounds, such as polyalkylene glycols, and others; chemical sensitizers, such as sulfur, gold and others; antifoggants and stabilizers, such as thiazolium salts, and others; developing agents, such as hydroquinone, and others; hardeners, such as aldehydes, and others; vehicles, particularly hydrophilic vehicles, such as gelatin, and others; brighteners, such as stilbenes, and others; spectral sensitizers, such as merocyanines, and others; absorbing and filter dyes, such as those described in Sawdey et al. U.S. Pat. No. 2,739,971, issued Mar. 27, 1956, and others; color materials for color photography film elements, such as color-forming couplers in U.S. Pat. No. 2,376,679 issued May 22, 1945; and coating aids, such as alkyl aryl sulfonates, and others. The photographic compounds include, also, mixtures of coating aids such as those disclosed in U.S. Pat. No. 3,775,126, issued Nov. 27, 1973, which can be used in simultaneous coating operations to coat hydrophilic colloid layers on the subbing layers of elements intended for color photography, for example, layers of silver halide emulsions containing color-forming couplers or emulsions to be developed in solutions containing couplers or other color-generating materials as disclosed above.

The film elements can also comprise charge control agents which control triboelectric charging of the elements below an electrostatic unit level detrimental to radiation sensitive elements. Such charge control agents may comprise perfluorohydrocarbons, e.g., cationic perfluorinated alkyl surfactant such as perfluorooctyl-sulfonamido (N-propyl-3-N,N,N-trimethyl)ammonium iodide, and other agents described in French Pat. No. 2,146,777, issued Mar. 2, 1973, and in U.S. Pat. No. 3,850,642 issued Nov. 26, 1974.

Photographic layers which can be applied to the heat-tempered support include layers of antistatic materials such as alkali metal salts of polymeric carboxylic acids or of cellulose sulfate described in U.S. Pat. No. 3,630,742.

The photographic layers applied to heat-tempered support film can be coated on the film by various coating procedures used in coating non-heat-tempered support, including dip coating, air knife coating, curtain coating, or extrusion coating using hoppers of the type described in Beguin U.S. Pat. No. 2,681,294 issued June 15, 1954. If desired, two or more layers may be coated simultaneously by the procedure described in U.S. Pat. No. 2,761,791, referred to above, U.S. Pat. No. 3,508,947, and British Pat. No. 837,095. The support film also can contain silver halide layers coated by vacuum evaporation as described in British Pat. No. 968,453.

The heat-tempered support of the invention can also be used in combination with silver halide for making elements used in dry development systems such as those described in patents listed in *Product Licensing Index*, op. cit., page 109, paragraph XX, and of direct print and printout photographic elements such as those described in patents listed at page 110, paragraph XXV of the publication.

The heat-tempered support also can be used in elements intended for use in image transfer systems, such as those described in the patents listed at page 109, paragraph XIX of the above publication.

If desired, the photographic elements of this invention also can be processed in hardening developers such as those described in Allen et al. U.S. Pat. No. 3,223,761 issued Feb. 1, 1966; in roller transport processors such as those described in Russell et al. U.S. Pat. No. 3,025,779 issued Mar. 20, 1962; or by surface application processing as described in Example 3 of Kitze U.S. Pat. No. 3,418,132 issued Dec. 24, 1968.

The invention has been described in detail with particular reference to preferred embodiments thereof, but it will be understood that variations and modification can be effected within the spirit and scope of the invention to obtain the advantages thereof.

We claim:

1. A method for heat tempering a self-supporting film having a thickness in the range of about 2 to 50 mils and formed from a thermoplastic polymer having a Tg above about 60° C., determined in a differential scanning calorimeter at a heating rate of 20° K./minute, to reduce the core-set curling tendency of said film without substantially distorting or shrinking said film, said method comprising maintaining said film for a period of about 0.1 to about 1,500 hours at a temperature of from about 30° C. up to the Tg of said polymer and an ambient relative humidity less than 100% until the core-set curling tendency of said film is reduced at least 15%, said reduction in core-set curling tendency being measurable as the change in the number of ANSI curl units that the heat-tempered film undergoes upon core-setting on a 3-inch o.d. core at 49° C. and 50% RH for 24 hours, compared to the change in the number of ANSI curl units that the corresponding film which has not been subjected to said heat-tempering undergoes upon core-setting in the same manner, said ANSI curl units being measured in each instance in accordance with Test Method A, ANSI PH 1.29-1971 with respect to the same reference surface of the film.

2. The method of claim 1 comprising maintaining said film at a temperature within the range of from about 38° C. up to about 4° C. below the Tg of the polymer.

3. The method of claim 2 comprising maintaining said film at said temperature for about 24 to 168 hours until its core-set curling tendency is reduced about 30 to 65%.

4. The method of claim 2 comprising maintaining said film at a temperature within the range of from about 60° to 95° C. for from about 0.25 to 24 hours until its core-set curling tendency is reduced about 40 to 65%.

5. The method of claim 1 wherein said film is in roll form when subjected to said heating.

6. The method of claim 5 comprising applying at least one layer of a coating composition over at least one surface of the film after said heat tempering.

7. The method of claim 1 comprising applying at least one layer of a coating composition over at least one surface of said thermoplastic polymer film before said heat tempering.

8. The method of claim 7 comprising winding the coated film to form a roll and subjecting said roll to said heat tempering.

9. The method of claim 8 comprising winding the coated film on a core of from about 6 inches to 12 inches outside diameter (o.d.) to form a roll of film of up to about 36 inches o.d. and subjecting said roll to said heat tempering.

10. The method of claim 1 wherein the polymer is a linear polyester, polycarbonate or cellulose ester.

11. The method of claim 1 wherein the polymer is poly(ethylene terephthalate), poly(1,4-cyclohexylene dimethylene terephthalate) or poly(ethylene-2,6-naphthalene dicarboxylate).

12. The method of claim 1 wherein the polymer is poly((2,2-bis(4-hydroxy-phenyl)propane carbonate)).

13. The method of claim 10 wherein the cellulose ester is cellulose triacetate containing from 42.5 to 44% acetyl.

14. The method of claim 11 wherein the polymer is poly(ethylene terephthalate) having a Tg in the range from about 99° C. to 112° C.

15. The method of claim 7 wherein the layer of coating composition is an adhesive-containing layer.

16. The method of claim 7 wherein the layer of coating composition is a gelatin-containing layer.

17. The method of claim 6 wherein the layer of coating composition is a radiation sensitive layer.

18. The method of claim 16 wherein the gelatin-containing layer is a photographic subbing layer.

19. The method of claim 17 wherein the radiation sensitive layer is a photographic silver halide emulsion layer.

20. The method of claim 17 wherein the radiation sensitive layer is a diazo layer.

21. A method for heat tempering a self-supporting film having a thickness in the range of about 2 to 50 mils and formed from poly(ethylene terephthalate) having a Tg above about 60° C., determined in a differential scanning calorimeter at a heating rate of 20° K./minute, to reduce the core-set curling tendency of said film without substantially distorting or shrinking said film, said method comprising maintaining said film for a period of about 0.1 to about 1,500 hours at a temperature of from about 38° C. to about 4° C. below the Tg of said poly(ethylene terephthalate) and an ambient relative humidity less than 100% until the core-set curling tendency of said film is reduced at least 30%, said reduction in core-set curling tendency being measurable as the change in the number of ANSI curl units that the heat-tempered film undergoes upon core-setting on a 3-inch o.d. core at 49° C. and 50% RH for 24 hours, compared to the change in the number of ANSI curl units that the corresponding film which has not been subjected to said heat-tempering undergoes upon core-setting in the same manner, said ANSI curl units being measured in each instance in accordance with Test Method A, ANSI PH 1.29-1971 with respect to the same reference surface of the film.

22. The method of claim 21 wherein the film is maintained at a temperature within the range of from about 40° C. to about 100° C. for about 0.25 to 168 hours.

23. The method of claim 22 wherein the film is maintained at a temperature within the range of from about 71° to 82° C. for about 0.25 to 24 hours.

24. The method of claim 22 wherein the poly(ethylene terephthalate) film is biaxially-oriented, heat-set, heat-relaxed poly(ethylene terephthalate) film.

25. The method of claim 24 wherein the poly(ethylene terephthalate) has a Tg of from about 99° C. to 112° C.

26. The method of claim 25 wherein the film is in roll form on a core of about 6 inches to 12 inches o.d.

27. The method of claim 26 wherein the poly(ethylene terephthalate) film is coated on at least one surface with at least one layer of a coating composition.

28. The method of claim 27 wherein said film is coated with at least one adhesion-promoting undercoating layer and at least one gelatin-containing layer.

29. The method of claim 27 wherein the film is a photographic film support.

30. The method of claim 27 wherein the film is a photographic film comprising at least one radiation sensitive layer.

31. The method of claim 30 wherein the radiation sensitive layer is a photographic silver halide emulsion layer.

32. The method of claim 30 wherein the radiation sensitive layer is a diazo layer.

33. A method for heat tempering a self-supporting biaxially-oriented, heat-set, heat-relaxed poly(ethylene terephthalate) film having a thickness of from about 2 to 50 mils and comprising at least one radiation sensitive layer to reduce the core-set curling tendency of said film without substantially distorting or shrinking said film, said poly(ethylene terephthalate) having a Tg of about 99° to 112° C., as determined by a differential scanning calorimeter (DSC) trace, which method comprises winding the film on a core of from about 6 inches to 12 inches outer diameter to form a roll of film and heating said roll at a temperature in the range of from about 40° C. up to about 4° C. below the Tg of the polymer for from about 0.25 to about 500 hours until the change in the number of ANSI curl units that the resulting film undergoes is about 22 to 69% below the change in the number of ANSI curl units that the corresponding poly(ethylene terephthalate) film which has not been subjected to said heat tempering undergoes upon core-setting under like conditions, said ANSI curl units being measured in accordance with Test Method A ANSI PH 1.29-1971 in each instance with respect to the same reference surface of the film.

34. The method of claim 33 wherein the radiation sensitive layer is a silver halide emulsion layer.

35. The method of claim 33 wherein the radiation sensitive layer is a diazo layer.

36. A method for heat tempering a self-supporting film having a thickness in the range of about 2 to 50 mils and formed from poly(ethylene-2,6-naphthalene dicarboxylate) having a Tg above about 60° C., determined in a differential scanning calorimeter at a heating rate of 20° K./minute, to reduce the core-set curling tendency of said film without substantially distorting or shrinking said film, said method comprising maintaining said film for a period of about 0.1 to about 1,500 hours at a temperature of from about 30° C. up to the Tg of said poly(ethylene-2,6-naphthalene dicarboxylate) and an ambient relative humidity less than 100% until the core-set curling tendency of said film is reduced at least 15%, said reduction in core-set curling tendency being measurable as the change in the number of ANSI curl units that the heat-tempered film undergoes upon core-setting on a 3-inch o.d. core at 49° C. and 50% RH for 24 hours, compared to the change in the number of ANSI curl units that the corresponding film which has not been subjected to said heat-tempering undergoes upon core-setting in the same manner, said ANSI curl units being measured in accordance with Test Method A ANSI PH 1.29-1971 in each instance with respect to the same reference surface of the film.

37. The method of claim 36 wherein the film is maintained at a temperature within the range of from about 60° C. to 180° C. for from 0.25 to 168 hours.

38. A self-supporting thermoplastic polymer film characterized in that said film is a heat-tempered film having reduced core-set curling tendency and that the change in ANSI curl units that said film undergoes upon being maintained in rolled condition for 2200 hours at a temperature of 21° C. and R.H. up to 50% is at least 15% less than the change in the number of ANSI curl units that the corresponding film which is not heat-tempered undergoes upon core-setting under like conditions, said ANSI curl units being measured in accordance with Test Method A, ANSI PH 1.29-1971 in each instance with respect to the same reference surface of the film.

39. A self-supporting, noncellulosic thermoplastic film characterized in that said film is a heat-tempered film having reduced core-set curling tendency and that the change in ANSI curl units that said film undergoes upon being maintained in rolled condition for 2200 hours at a temperature of 21° C. and R.H. up to 50% is no more than 14 ANSI curl units measured at 50% R.H., said ANSI curl units being measured in accordance with Test Method A, ANSI PH 1.29-1971 with reference to the same surface of the film.

40. A self-supporting polymer film according to claim 38 in which said polymer is a polyester or a polycarbonate.

41. A self-supporting cellulose ester film according to claim 38 characterized in that the change in ANSI curl units that said film undergoes upon being maintained in rolled condition is an increase of no more than about 22 to 27 ANSI units measured at 50% R.H.

42. A laminated film element comprising a film of claim 39.

43. A laminated film element comprising a film of claim 41.

44. A film according to claim 38 wherein said film is a polymeric film having a thickness of about 2 to 50 mils.

45. A film according to claim 40 having a thickness of about 2 to 50 mils and wherein the polymer is
poly(ethylene terephthalate),
poly(1,4-cyclohexylene dimethylene terephthalate), or
poly(ethylene-2,6-naphthalene dicarboxylate).

46. A film according to claim 40 which is heat-tempered, biaxially-oriented, heat-set and heat-relaxed solid linear polyester film.

47. A film according to claim 41 wherein the polymer is cellulose triacetate containing from 42.5 to 44.0% of acetyl.

48. A film according to claim 38 wherein said film has at least one coating layer on at least one surface.

49. A film according to claim 38 wherein said film is coated with at least one radiation sensitive layer.

50. A film according to claim 49 wherein said radiation sensitive layer is a photographic silver halide emulsion layer.

51. A film according to claim 49 wherein said radiation sensitive layer is a diazo layer.

52. A film according to claim 40 wherein said film comprises at least one adhesion promoting layer and contiguous thereto at least one gelatin-containing layer.

53. A multilayered radiation sensitive film element comprising a support and at least one radiation sensitive layer, said support being a thermoplastic polymer film according to claim 38.

54. The element of claim 53 wherein said polymer film is a linear polyester, polycarbonate or cellulose ester.

55. The element of claim 53 wherein said radiation sensitive layer is a photographic silver halide emulsion layer.

56. The element of claim 53 wherein said radiation sensitive layer is a diazo layer.

57. A film according to claim 53 wherein the film is a microfilm.

58. A film according to claim 53 wherein the film is a cinematographic film.

59. A multilayered radiation sensitive film element comprising a support and at least one radiation sensitive layer, said support comprising a thermoplastic polymer film having a thickness of about 2 to 10 mils, said polymer being poly(ethylene terephthalate), poly(1,4-cyclohexylene dimethylene terephthalate), or poly(ethylene-2,6-naphthalene dicarboxylate), said film element being characterized in that said polymer film is a heat-tempered film having reduced core-set curling tendency and in that the change in ANSI curl units that said element undergoes upon being maintained in rolled condition for 2200 hours at a temperature of 20° C. and relative humidity (R.H.) up to 50% is ± 14 ANSI curl units, said ANSI curl units being measured at 50% R.H. in accordance with Test Method A ANSI PH 1.29-1971 with reference to the same surface of the film.

60. A microfiche comprising a thermoplastic polymer film support having a thickness of about 2 to 10 mils, said polymer being poly(ethylene terephthalate), said microfiche being characterized in that said polymer film is a heat-tempered film having reduced core-set curling tendency and said microfiche being further characterized in that the curl value of said microfiche is not more than ± 9 ANSI curl units, said ANSI curl units being measured at 50% R.H. in accordance with Test Method A ANSI PH 1.29-1971.

61. A method according to claim 1 which comprises the additional step of maintaining the film after said heat tempering in a temperature range below the temperature at which the effect of said heat-tempering is lost.

62. A method according to claim 21 which comprises the additional step of maintaining the film after said heat tempering in a temperature range below the temperature at which the effect of said heat-tempering is lost.

63. A method according to claim 33 which comprises the additional step of maintaining the film after said heat tempering in a selected temperature range below the temperature at which the effect of said heat-tempering is lost.

* * * * *